(12) United States Patent
Nagatsuka et al.

(10) Patent No.: US 11,200,695 B2
(45) Date of Patent: Dec. 14, 2021

(54) SYSTEM, JIG, INFORMATION PROCESSING DEVICE, INFORMATION PROCESSING METHOD, AND PROGRAM

(71) Applicant: Sony Interactive Entertainment Inc., Tokyo (JP)

(72) Inventors: Norio Nagatsuka, Saitama (JP); Takeshi Yamagishi, Kanagawa (JP)

(73) Assignee: Sony Interactive Entertainment Inc., Tokyo (JP)

( * ) Notice: Subject to any disclaimer, the term of this patent is extended or adjusted under 35 U.S.C. 154(b) by 148 days.

(21) Appl. No.: 16/464,452

(22) PCT Filed: Nov. 28, 2017

(86) PCT No.: PCT/JP2017/042476
§ 371 (c)(1),
(2) Date: May 28, 2019

(87) PCT Pub. No.: WO2018/105434
PCT Pub. Date: Jun. 14, 2018

(65) Prior Publication Data
US 2019/0378298 A1    Dec. 12, 2019

(30) Foreign Application Priority Data
Dec. 5, 2016  (JP) .............................. JP2016-236279

(51) Int. Cl.
*G06T 7/73* (2017.01)
*G06K 9/62* (2006.01)
(Continued)

(52) U.S. Cl.
CPC ................ *G06T 7/74* (2017.01); *B25J 19/04* (2013.01); *G06K 9/6255* (2013.01); *H04L 67/42* (2013.01)

(58) Field of Classification Search
CPC ........ G06K 9/6217; G06K 9/3208; G06T 7/74
See application file for complete search history.

(56) References Cited

U.S. PATENT DOCUMENTS

| 7,084,900 B1 | 8/2006 | Watanabe |
|---|---|---|
| 7,200,260 B1 | 4/2007 | Watanabe |
| (Continued) | | |

FOREIGN PATENT DOCUMENTS

| JP | 2000288968 A | 10/2000 |
|---|---|---|
| JP | 2000293695 A | 10/2000 |
| (Continued) | | |

OTHER PUBLICATIONS

Extended European Search Report for corresponding EP Application No. 17878629.9, 7 pages, dated May 29, 2020.
(Continued)

*Primary Examiner* — John J Lee
(74) *Attorney, Agent, or Firm* — Matthew B. Dernier, Esq.

(57) ABSTRACT

There is provided a system including one or a plurality of information processing apparatuses that individually or cooperatively realize functions including a first image acquisition function of acquiring a first image of an object, an angle information acquisition function of acquiring angle information indicating an angle of the object in the first image, a dictionary data generation function of generating dictionary data based on the first image and the angle information, a second image acquisition function of acquiring a second image of the object different from the first image; and an angle estimation function of estimating an angle of the object in the second image based on the second image and the dictionary data.

16 Claims, 16 Drawing Sheets

(51) Int. Cl.
  *B25J 19/04* (2006.01)
  *H04L 29/06* (2006.01)

(56) References Cited

U.S. PATENT DOCUMENTS

| | | | |
|---|---|---|---|
| 8,885,923 | B2 | 11/2014 | Ishiyama |
| 9,111,348 | B2 | 8/2015 | Amma |
| 2003/0144765 | A1* | 7/2003 | Habibi ............... B25J 9/1697 |
| | | | 700/259 |
| 2006/0013470 | A1 | 1/2006 | Nagatsuka |
| 2009/0196467 | A1* | 8/2009 | Okubo ............. G06K 9/00288 |
| | | | 382/118 |
| 2011/0069880 | A1 | 3/2011 | Sergieiev |
| 2013/0006423 | A1 | 1/2013 | Ito |
| 2013/0010095 | A1 | 1/2013 | Aoki |
| 2013/0202212 | A1 | 8/2013 | Wu |
| 2013/0329035 | A1 | 12/2013 | Yamamoto |
| 2014/0161346 | A1 | 6/2014 | Ishiyama |
| 2014/0204018 | A1 | 7/2014 | Murase |
| 2014/0270361 | A1 | 9/2014 | Amma |
| 2014/0294292 | A1 | 10/2014 | Aoba |
| 2015/0015730 | A1* | 1/2015 | Choi .............. H04N 5/232933 |
| | | | 348/211.1 |
| 2016/0033270 | A1 | 2/2016 | Von Matern |
| 2017/0251911 | A1* | 9/2017 | Ito ..................... G02B 23/2438 |

FOREIGN PATENT DOCUMENTS

| | | |
|---|---|---|
| JP | 2003346152 A | 12/2003 |
| JP | 2005128959 A | 5/2005 |
| JP | 2006026790 A | 2/2006 |
| JP | 2007245283 A | 9/2007 |
| JP | 2011523718 A | 8/2011 |
| JP | 2015169515 A | 9/2015 |
| JP | 2016103094 A | 6/2016 |
| JP | 2016517084 A | 6/2016 |
| WO | 2009141783 A1 | 11/2009 |
| WO | 2011086889 A1 | 7/2011 |
| WO | 2014151035 A1 | 9/2014 |

OTHER PUBLICATIONS

International Search Report for corresponding PCT Application No. PCT/JP2017/042476, 2 pages, dated Feb. 27, 2019.
International Search Report for related PCT Application No. PCT/JP2017/042475, 2 pages, dated Feb. 27, 2018.
Extended European Search Report for corresponding EP Application No. 17879522.5, 9 pages, dated Apr. 16, 2020.
Felix Endres et al.: "An evaluation of the RGB-D SLAM system", Robotics and Automation (ICRA). 2012 International Conference ON. IEEE, pp. 1691-1696, dated May 14, 2012.
International Preliminary Report on Patentability and Written Opinion for corresponding PCT Application No. PCT/JP2017/042475, 8 pages, dated Jun. 11, 2019.
International Preliminary Report on Patentability and Written Opinion for corresponding PCT Application No. PCT/JP2017/042476, 10 pages, dated Jun. 11, 2019.
Notice of Reasons for Refusal for corresponding JP Application No. 2016-236279, 6 pages, dated Feb. 24, 2021.

* cited by examiner

SYSTEM, JIG, INFORMATION PROCESSING DEVICE, INFORMATION PROCESSING METHOD, AND PROGRAM

TECHNICAL FIELD

The present invention relates to a system, a jig, an information processing apparatus, an information processing method, and a program.

BACKGROUND ART

Image-based object recognition is a general technique in recent years. In the image-based object recognition, for example, an amount of features of an image captured by an imaging apparatus is extracted, and the amount of features is matched with an amount of features registered in advance as dictionary data to thereby recognize an object in the image. Here, a change in the angle of the object in the image also changes the amount of features, and therefore, the dictionary data needs to be prepared for each angle of the object in order to increase the availability of the object recognition.

PTL 1 and PTL 2 are examples of a technique for preparing the dictionary data for each angle of the object in the image-based object recognition. PTL 1 describes a technique of recognizing an object based on eight images obtained by rotating the object at 45-degree intervals. PTL 2 describes a technique of learning a model of an object by recognizing common parts from a large number of images obtained by rotating the object in a horizontal angle direction and a zenith angle direction in five-degree increments or the like.

CITATION LIST

Patent Literature

[PTL 1] Japanese Patent Laid-Open No. 2003-346152
[PTL 2] U.S. Patent Application Publication No. 2013/0202212

SUMMARY OF INVENTION

Technical Problem

The techniques are techniques for recognizing the object in the image, that is, estimating what the object in the image is, and it is not intended to draw out additional information from the image. However, in view of the diversified fields in which the technique of object recognition is used in recent years, it can be advantageous to provide additional information regarding the object based on the image.

Therefore, an object of the present invention is to provide new and improved system, jig, information processing apparatus, information processing method, and program that can estimate an angle of an object based on an image.

Solution to Problem

An aspect of the present invention provides a system including one or a plurality of information processing apparatuses that individually or cooperatively realize functions including a first image acquisition function of acquiring a first image of an object, an angle information acquisition function of acquiring angle information indicating an angle of the object in the first image, a dictionary data generation function of generating dictionary data based on the first image and the angle information, a second image acquisition function of acquiring a second image of the object different from the first image, and an angle estimation function of estimating an angle of the object in the second image based on the second image and the dictionary data.

In addition, another aspect of the present invention provides a jig capable of being attached to a platform device, the platform device including a base portion that rotates about a first axis, a pair of supports fixed at positions symmetric with respect to the first axis on the base portion, a pair of arms connected to the pair of supports, respectively, so as to be pivotable about a second axis orthogonal to the first axis, on an opposite side of the base portion, a holder fixed between edges of the pair of arms, on an opposite side of the pair of supports, and a control unit that sets an angle of the base portion rotating about the first axis and an angle of the pair of arms pivoting about the second axis. The jig includes an attachment member capable of being attached to the holder of the platform device, an object holder for attaching the object, and a connecting member that connects the attachment member and the object holder and defines a positional relationship between the attachment member and the object holder such that the object attached to the object holder is positioned near an intersection of the first axis and the second axis when the attachment member is attached to the holder of the platform device.

In addition, yet another aspect of the present invention provides an information processing apparatus including a processor that realizes functions including an image acquisition function of acquiring a plurality of images of an object different from each other, an angle information acquisition function of acquiring angle information common to the plurality of images, the angle information indicating an angle of the object, and a dictionary data generation function of generating dictionary data based on the plurality of images and the angle information common to the plurality of images.

In addition, yet another aspect of the present invention provides an information processing apparatus including a processor that realizes functions including a dictionary data acquisition function of acquiring a first image of an object and dictionary data generated based on angle information indicating an angle of the object in the first image, an image acquisition function of acquiring a second image of the object different from the first image, and an angle estimation function of estimating an angle of the object in the second image based on the second image and the dictionary data.

In addition, yet another aspect of the present invention provides an information processing method including a step of acquiring a plurality of images of an object different from each other, a step of acquiring angle information common to the plurality of images, the angle information indicating an angle of the object, and a step of using a processor to generate dictionary data based on the plurality of images and the angle information common to the plurality of images.

In addition, yet another aspect of the present invention provides an information processing method including a step of acquiring dictionary data generated based on a first image of an object and angle information indicating an angle of the object in the first image, a step of acquiring a second image of the object different from the first image, and a step of using a processor to estimate an angle of the object in the second image based on the second image and the dictionary data.

In addition, yet another aspect of the present invention provides a program for causing a processor to realize functions including an image acquisition function of acquiring a plurality of images of an object different from each other, an angle information acquisition function of acquiring angle information common to the plurality of images, the angle information indicating an angle of the object, and a dictionary data generation function of generating dictionary data based on the plurality of images and the angle information common to the plurality of images.

In addition, yet another aspect of the present invention provides a program for causing a processor to realize functions including a dictionary data acquisition function of acquiring dictionary data generated based on a first image of an object and angle information indicating an angle of the object in the first image, a second image acquisition function of acquiring a second image of the object different from the first image, and an angle estimation function of estimating an angle of the object in the second image based on the second image and the dictionary data.

DESCRIPTION OF EMBODIMENTS

Hereinafter, some embodiments of the present invention will be described in detail with reference to the attached drawings. Note that in the present specification and the drawings, overlapping description will be omitted by providing the same reference signs to the constituent elements with substantially the same functional configurations.

First Embodiment

Figure 1:
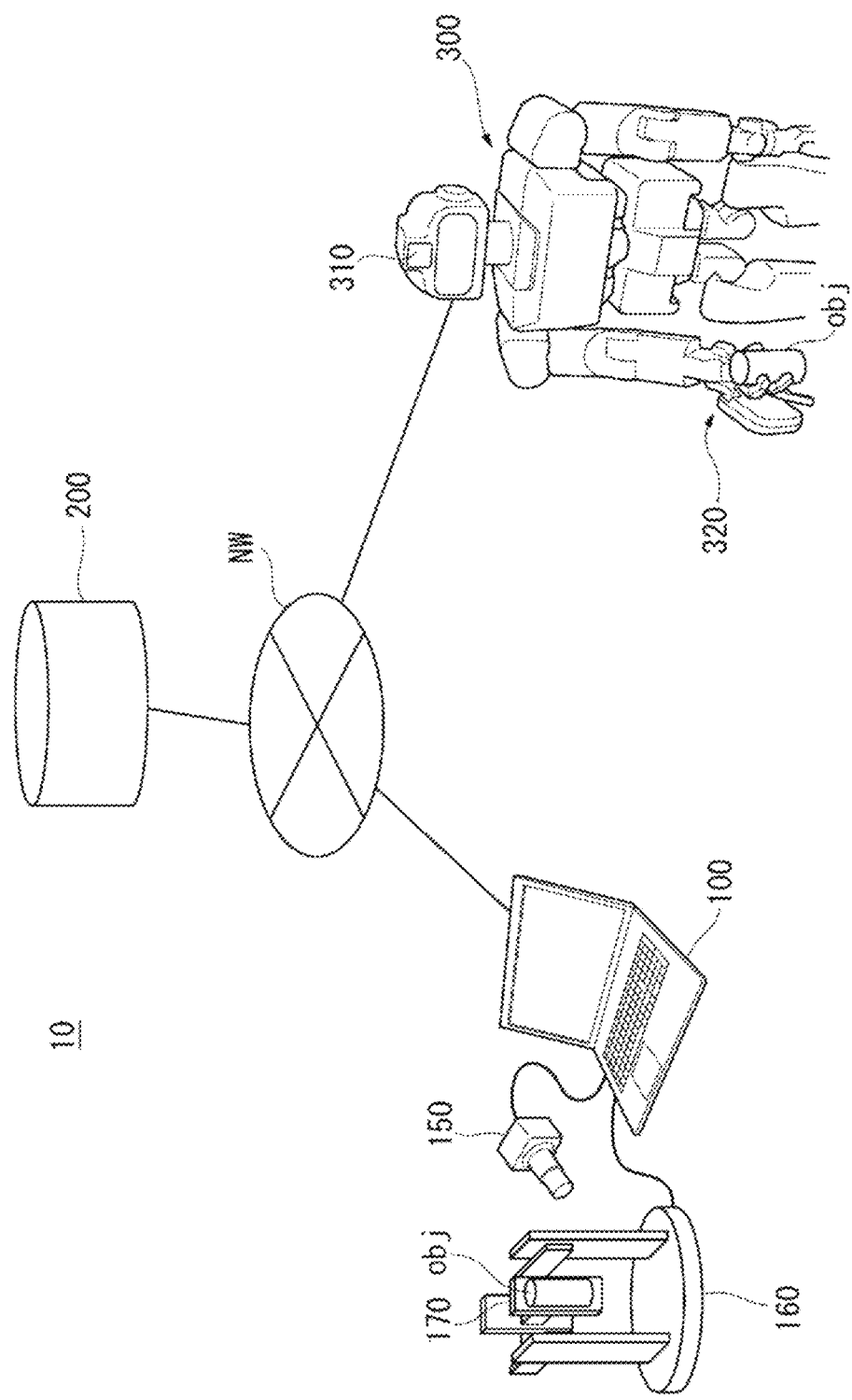
FIG. 1 is a schematic diagram illustrating a system according to a first embodiment of the present invention.

FIG. 1 is a schematic diagram illustrating a system 10 according to a first embodiment of the present invention. With reference to FIG. 1, the system 10 includes a terminal 100, a database 200, and a robot 300 connected to each other through a network NW. A camera 150 and a platform device 160 are connected to the terminal 100. The robot 300 includes a camera 310 and a manipulator 320.

In the system 10, the camera 150 captures an image of an object obj attached to the platform device 160 through a jig 170 described later. The terminal 100 acquires the image from the camera 150 and acquires angle information indicating an angle of the object obj from the platform device 160. Note that in the following description, the angle of the object obj is an angle in a three-dimensional space, such as an angle indicated by an amount of rotation about three axes in an orthogonal coordinate system, unless otherwise specifically stated. The terminal 100 generates dictionary data based on the acquired image and angle information (as well as identification information of the object obj). The generated dictionary data is stored in the database 200.

On the other hand, the robot 300 uses the camera 310 to capture an image of the object obj while the manipulator 320 holds the object obj. The robot 300 recognizes the object obj in the image based on the captured image and the dictionary data acquired from the database 200 and further estimates the angle of the object obj in the image.

In this way, the robot 300 can recognize the object obj and further estimate the angle of the object obj held by the manipulator 320. The angle indicates, for example, the degree of rotation of the object obj with respect to a reference posture. The robot 300 can, for example, control the manipulator 320 based on the estimation result of the angle to rotate the object obj to thereby set the object obj to a desirable posture.

The system 10 is useful for, for example, using the robot 300 to automate the work of arranging or organizing commodities. The system 10 is also useful for, for example, specifying how to rotate the object obj in order to read information (such as a printed code and a radio frequency identifier (RFID)) arranged at a predetermined part of the object obj. Note that the uses of the system 10 are not limited to the examples, and there can be various other uses.

(Configuration for Generating Dictionary Data)

Figure 2:
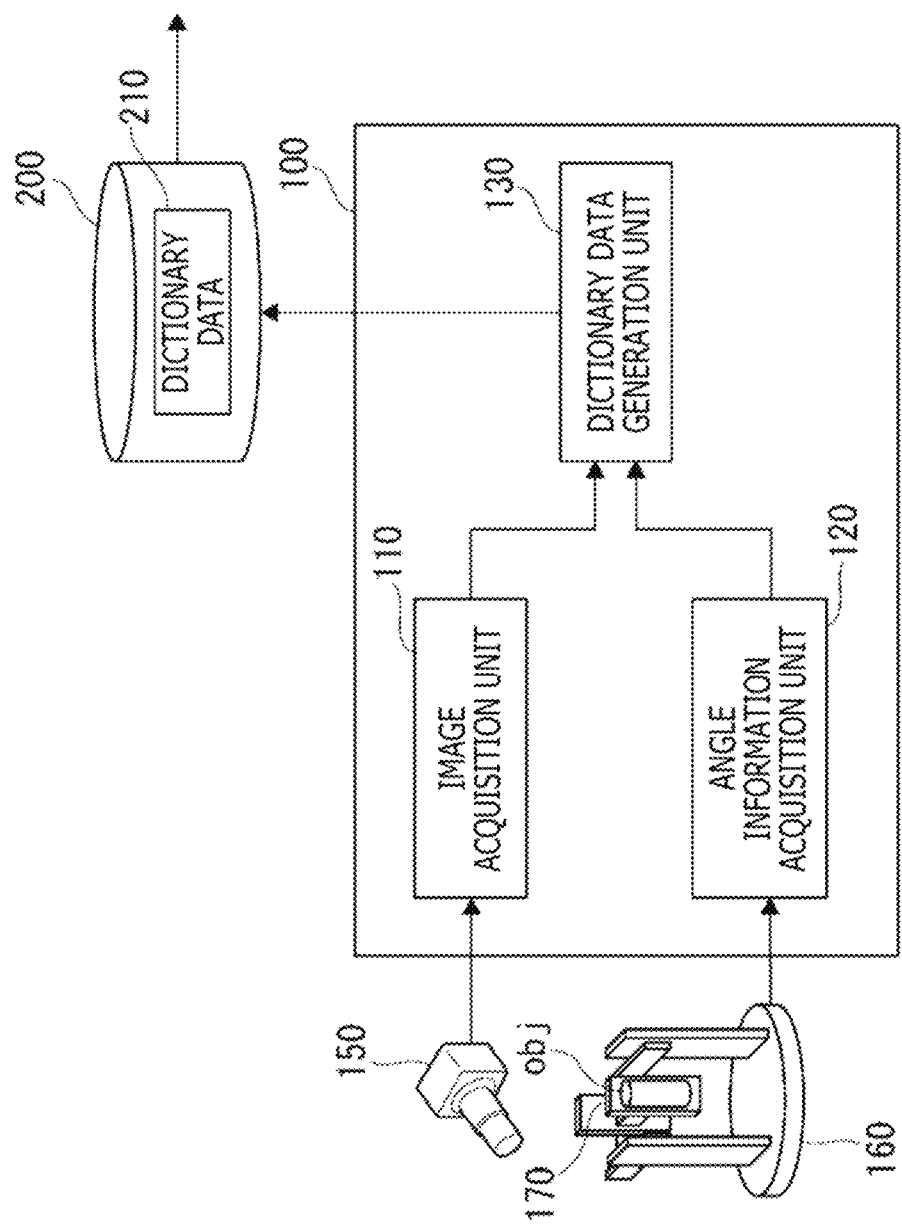
FIG. 2 is a block diagram illustrating a functional configuration of a terminal in the system illustrated in FIG. 1.

FIG. 2 is a block diagram illustrating a functional configuration of the terminal 100 in the system illustrated in FIG. 1. With reference to FIG. 2, the terminal 100 includes an image acquisition unit 110, an angle information acquisition unit 120, and a dictionary data generation unit 130. The terminal 100 is, for example, a personal computer, a tablet, a smartphone, or the like, and functions of the components are realized by a hardware configuration of an information processing apparatus described later. Specifically, for example, the functions of the image acquisition unit 110, the angle information acquisition unit 120, and the dictionary data generation unit 130 are realized by a processor included in the information processing apparatus. Dictionary data 210 generated by the dictionary data generation unit 130 is stored in the database 200 connected to the terminal 100 through the network. The function of the database 200 is realized by storage of one or a plurality of information processing apparatuses connected to the network. Note that in a case where the terminal 100 includes a plurality of processors, the plurality of processors may cooperate to realize the functions of the components. In addition, as described later, part or all of the functions realized by the processor of the terminal 100 can also be realized by a server. Hereinafter, the functions of the components will be described.

The image acquisition unit 110 acquires the image of the object obj captured by the camera 150. Here, the camera 150 is an example of an imaging apparatus that captures an image of an object. Specifically, the camera 150 is, for example, a digital camera including an image sensor, and the image acquisition unit 110 receives image data generated by the camera 150. Although the camera 150 is connected to the terminal 100 through a wired communication interface, such as a universal serial bus (USB), in the illustrated example, the camera 150 may be connected to the terminal 100 through a wireless communication interface, such as Bluetooth (registered trademark), in another example. Alternatively, the camera 150 may be built in the terminal 100 and may transmit the image data to the image acquisition unit 110 through a bus.

The angle information acquisition unit 120 acquires the angle information indicating the angle of the object obj from the platform device 160. Here, in the present embodiment, the angle information acquired by the angle information acquisition unit 120 of the terminal 100 indicates an angle of the object obj on the basis of a coordinate system of the platform device 160. Note that a case in which the angle information acquisition unit 120 generates the angle information of the object obj, transmits the angle information to the platform device 160, and provides the angle information to the dictionary data generation unit 130 is also included in the case in which "the angle information acquisition unit 120 acquires the angle information." In this case, the platform device 160 sets the angle of holding the object obj according to the angle information received from the angle information acquisition unit 120. In the present embodiment, the platform device 160 is an example of holding means for holding the object obj. Similar to the camera 150, the platform device 160 may also be connected to the terminal 100 through a wired communication interface or may be connected to the terminal 100 through a wireless communication interface.

As described above, the angle of the object obj is an angle in the three-dimensional space, such as an angle indicated by an amount of rotation about three axes in the orthogonal coordinate system. Therefore, the angle information acquisition unit 120 expresses the angle information by, for example, the amount of rotation equivalent to the difference between the current posture and the reference posture of the object obj. Here, the reference posture is, for example, a posture of the object obj when the platform device 160 is reset. Alternatively, the reference posture may be a posture of the object obj when the image acquisition unit 110 first acquires the image of the object obj to generate the dictionary data 210.

The dictionary data generation unit 130 generates the dictionary data 210 based on the image acquired by the image acquisition unit 110, the identification information of the object obj, and the angle information acquired by the angle information acquisition unit 120. Here, the identification information of the object obj may be specified by any means. For example, the identification information of the object obj may be specified based on information input to the terminal 100 by the user. The identification information of the object obj may also be specified by matching the image acquired by the image acquisition unit 110 with dictionary data separately provided for image-based object recognition. Alternatively, the dictionary data generation unit 130 may allocate the identification information to the object obj commonly included in a plurality of images acquired by the image acquisition unit 110.

Note that an already known technique in image-based object recognition can be appropriately used for the combination of the image and the identification information of the object obj in the information used for generating the dictionary data 210 in the present embodiment. For example, the dictionary data generation unit 130 may use an appropriate method used in the image-based object recognition to extract an amount of features from the image and may associate the extracted amount of features with the identification information and the angle information of the object obj. In addition, for example, the dictionary data generation unit 130 may use the identification information of the object obj classified and labeled by an appropriate method used in the image-based object recognition.

In addition, although the dictionary data 210 is generated based on the identification information of the object obj in the description of the present embodiment, the dictionary data 210 may not be generated based on the identification information of the object obj. For example, in a case where the system 10 is provided for a single type of object obj, the dictionary data 210 may not include the identification information of the object obj. On the other hand, in the case where the dictionary data 210 includes the identification information of the object obj as in the present embodiment, a plurality of types of objects obj can be recognized, and then the angles of the objects obj can be further estimated.

(Configuration of Platform Device and Jig)

Hereinafter, the configuration of the platform device 160 used with the terminal 100 in the system 10 according to the present embodiment and the configuration of the jig 170 for attaching the object obj to the platform device 160 will be further described.

Figure 3:
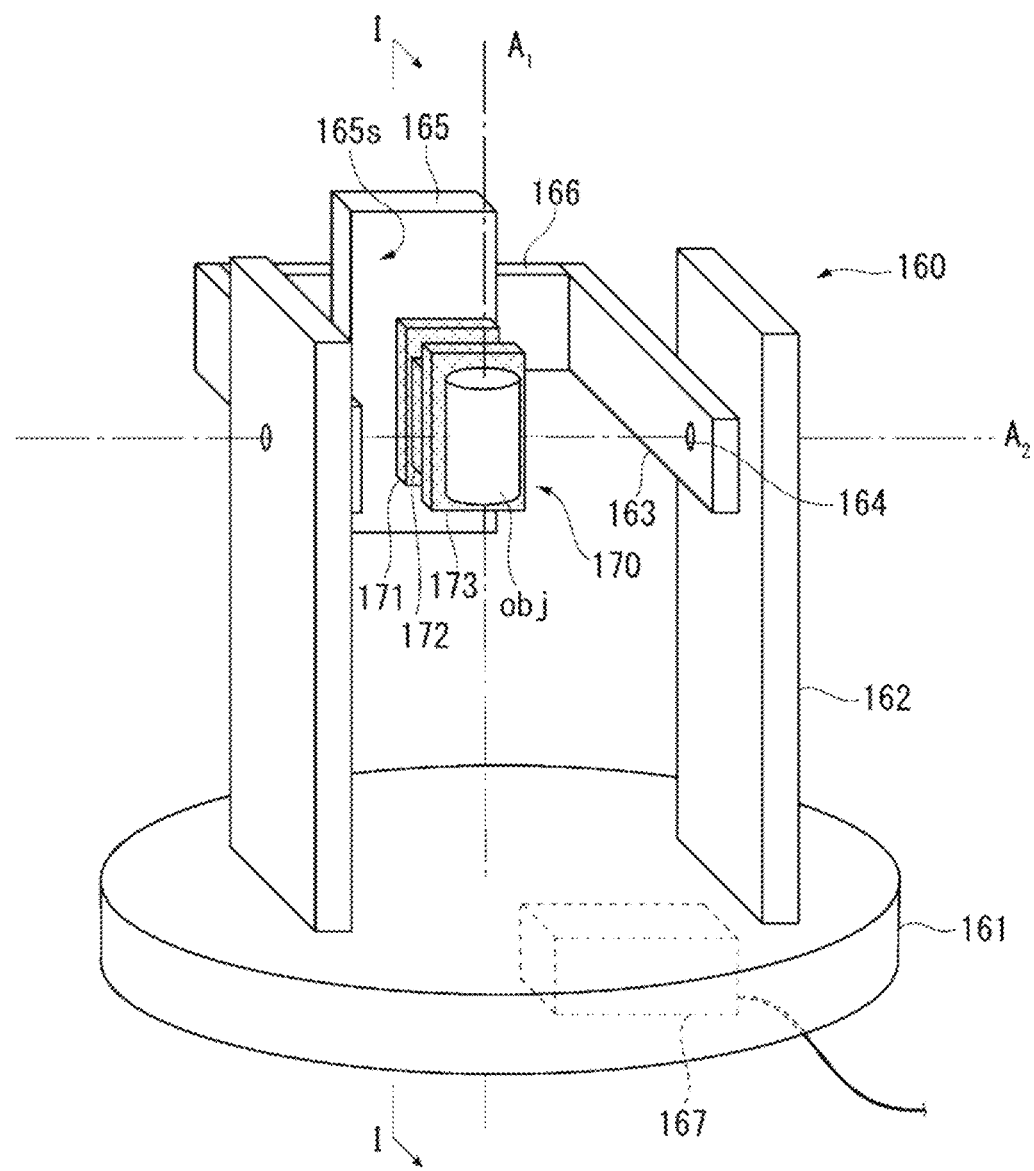
FIG. 3 is a schematic perspective view illustrating a configuration of a platform device and a jig used in the system illustrated in FIG. 1.
Figure 4:
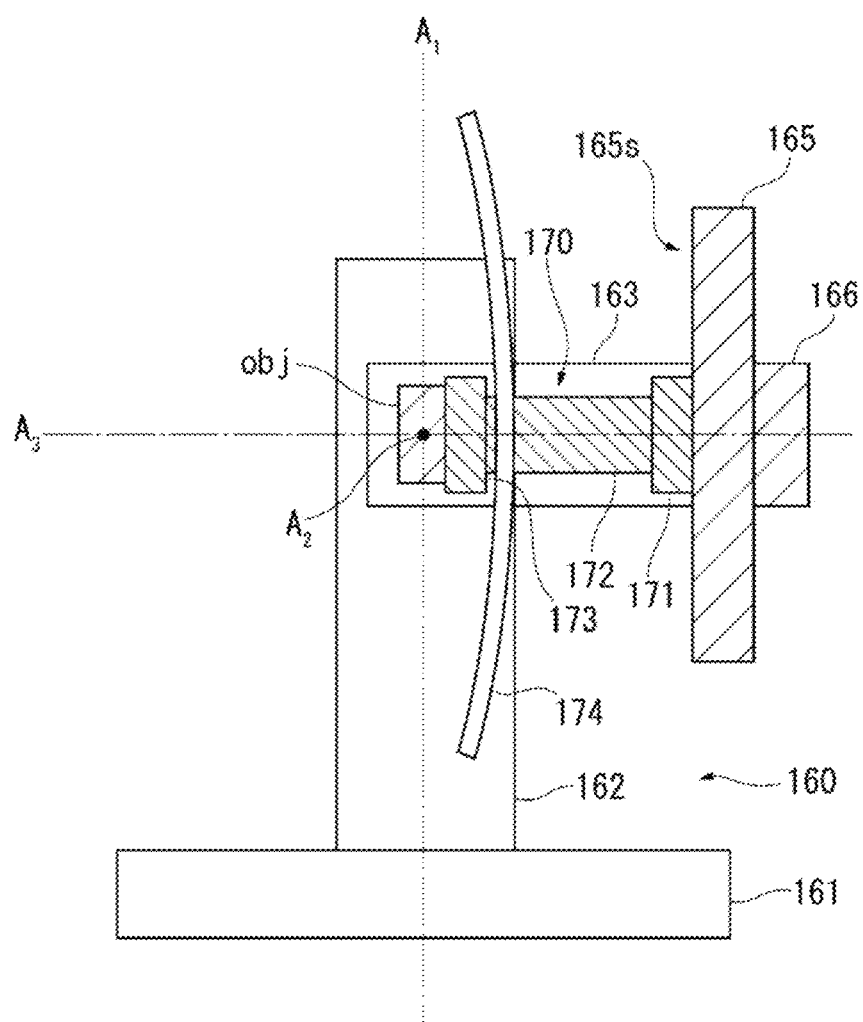
FIG. 4 is a cross-sectional view taken along line I-I of FIG. 3.

FIG. 3 is a schematic perspective view illustrating the configuration of the platform device 160 and the jig 170 used in the system illustrated in FIG. 1. FIG. 4 is a cross-sectional view taken along line I-I of FIG. 3. With reference to FIGS. 3 and 4, the platform device 160 includes a base 161, a pair of supports 162, a pair of arms 163, a pair of pins 164, a holder 165, a beam 166, and a control unit 167. The jig 170 includes an attachment member 171, a connecting member 172, an object holder 173, and a background plate 174. Note that the background plate 174 is not illustrated in FIG. 3. Hereinafter, each component will be described.

In the platform device 160, the base 161 is, for example, a rotary table. The base 161 is driven by a motor (not illustrated) controlled by the control unit 167 and rotates about an axis $A_1$. Here, the axis $A_1$ is orthogonal to an optical axis (illustrated as an axis $A_3$ in FIG. 4) of the camera 150. The pair of supports 162 are fixed on the base 161 at positions symmetric with respect to the axis $A_1$. Therefore, the midpoint of the pair of supports 162 substantially coincides with the axis $A_1$. The pins 164 are used to connect the pair of arms 163 to the pair of supports 162, respectively, on the opposite side of the base 161. The pins 164 are positioned on an axis $A_2$ orthogonal to the axis $A_1$. Each of the pair of arms 163 is pivotable about the axis $A_2$. Specifically, the pair of supports 162 and the pins 164 are connected through gears, or the pins 164 and the pair of arms 163 are connected through gears. A motor (not illustrated) controlled by the control unit 167 is connected to the gears, and the pair of arms 163 pivot about the axis $A_2$.

The holder 165 is fixed between edges of the pair of arms 163 through the beam 166, on the opposite side of the pair of supports 162. Although the holder 165 is a member provided with a camera in a case where, for example, the platform device 160 is used as an automatic platform for camera, the attachment member 171 of the jig 170 is attached to the holder 165 in the present embodiment as described later. As described above, when the pair of arms 163 pivot about the axis $A_2$, the holder 165 revolves about the axis $A_2$. Here, while the holder 165 revolves about the axis $A_2$ according to the configuration of the pair of arms 163, an attachment surface 165s of the holder 165 is maintained to face the axis $A_2$.

The control unit 167 is, for example, a microcontroller incorporated into the platform device 160, and the control unit 167 controls the motor as described above to control the rotation of the base 161 and the pivot of the pair of arms 163. The control unit 167 controls the motor according to, for example, a predetermined procedure or an instruction from the terminal 100. In this way, the control unit 167 sets the angle of the rotation of the base 161 about the axis $A_1$ and the angle of the pivot of the pair of arms 163 about the axis $A_2$. The angle information acquisition unit 120 of the terminal 100 acquires, for example, angle information that is information indicating the values of the angles set by the control unit 167.

The platform device 160 described above is principally distributed as an apparatus that automates the pan (rotation about axis $A_1$) and the tilt (switch about axis $A_2$) of the camera attached to the holder 165. The present embodiment is intended to use the platform device 160 to automate the setting of the angle of the object obj to thereby efficiently generate the dictionary data 210 covering various angles. However, in a case where the object obj is directly attached to the holder 165 of the platform device 160, the holder 165 swings about the axis $A_2$ when the pair of arms 163 pivot, and as a result, the position of the object obj becomes significantly out of the optical axis of the camera 150 (illustrated as axis $A_3$ in FIG. 4). Therefore, the object obj is attached to the platform device 160 through the jig 170 as described below in the present embodiment.

In the jig 170, the attachment member 171 is a member that can be attached to the holder 165 of the platform device 160. For example, the attachment member 171 is provided with an attachment structure corresponding to the structure for fixing the camera provided on the holder 165. Specifically, in a case where the holder 165 is provided with a screw for fixing the camera, the attachment member 171 is provided with a screw hole. Alternatively, the attachment member 171 may be provided with an attachment structure that can be used regardless of the structure of the holder 165. Specifically, the attachment member 171 may be provided with a clip for sandwiching the holder 165, a belt wound around the holder 165, or the like.

The object holder 173 is a member for attaching the object obj. For example, the object holder 173 is provided with an attachment structure that can fix the object obj while reducing the area of contact with the object obj as much as possible. This is because the contact area of the attachment structure and the object obj may become an occlusion region in the image of the object obj captured by the camera 150. Specifically, the object holder 173 may be provided with a clip for sandwiching the object obj, a hook for grasping the object obj, an adhesive surface for attaching the object obj, or the like. In addition, the object holder 173 may be provided with a magnet for the object obj that is a magnetic substance.

The connecting member 172 connects the attachment member 171 and the object holder 173. In addition, the connecting member 172 defines the positional relationship between the attachment member 171 and the object holder 173 so that the object obj attached to the object holder 173 is positioned near the intersection of the axis $A_1$ and the axis $A_2$ when the attachment member 171 is attached to the holder 165 of the platform device 160. For example, the connecting member 172 is connected to the attachment member 171 so as to extend along the pair of arms 163 when the attachment member 171 is attached to the holder 165. In this case, the length of the connecting member 172 in the direction along the pair of arms 163 is substantially equivalent to the distance obtained by subtracting the thicknesses of the attachment member 171 and the object holder 173 and a half of the thickness of the object obj from the distance between the holder 165 and the axis $A_2$. The connecting member 172 may have a structure that can adjust the length in the direction along the arms 163. This allows to adjust the length of the connecting member 172 according to the size of the object obj to bring the center of the object obj close to the intersection of the axis $A_1$ and the axis $A_2$.

The object obj attached to the platform device 160 through the jig 170 as described above is positioned near the intersection of the axis $A_1$ and the axis $A_2$. Therefore, even when the base 161 of the platform device 160 rotates about the axis $A_1$ or when the pair of arms 163 pivot about the axis $A_2$, there is substantially no change in the position of the object obj, and the position does not become significantly out of the optical axis of the camera 150 (illustrated as axis $A_3$ in FIG. 4). Therefore, when the control unit 167 of the platform device 160 sets the angle of the rotation of the base 161 about the axis $A_1$ and the angle of the pivot of the pair of arms 163 about the axis $A_2$, the angles can be regarded as the amount of rotation of the object obj about the axis $A_1$ and the axis $A_2$ in the present embodiment.

Note that in the case where the platform device 160 and the jig 170 are used, although the object obj is not rotated about the axis $A_3$ orthogonal to the axis $A_1$ and the axis $A_2$, that is, the optical axis of the camera 150, the rotation about the axis $A_3$ can be accurately complemented by plane rotation of the image captured by the camera 150. In addition, although the object obj is on the optical axis of the camera 150 in the description above for simplification, the object obj may not be on the optical axis of the camera 150.

The background plate 174 is attached to the connecting member 172 or the object holder 173 and provides the background of the object obj. For example, the background plate 174 may be provided with an attachment structure for selectively attaching a screen. The screen can include, for example, a plurality of screens formed by different materials. Examples of the materials include paper, cloth, and film. The screens may also include a plurality of screens in different colors or different reflection characteristics. The screen can be exchanged to provide a plurality of exchangeable backgrounds of the object obj with different materials, colors, reflection characteristics, or the like. In addition, the background plate 174 may be, for example, removably attached to the connecting member 172 or the object holder 173. In this case, a plurality of background plates 174 can be selectively attached to provide a plurality of exchangeable backgrounds of the object obj with different materials, colors, reflection characteristics, or the like. Specifically, the background plate 174 may include, for example, a plurality of background plates 174 in which the surfaces facing the object obj are formed by different materials. Examples of the materials include paper, cloth, and film. The background plate 174 may also include a plurality of background plates 174 in which the surfaces facing the object obj are in different colors or different reflection characteristics.

(Conceptual Description of Dictionary Data)

Figure 5:
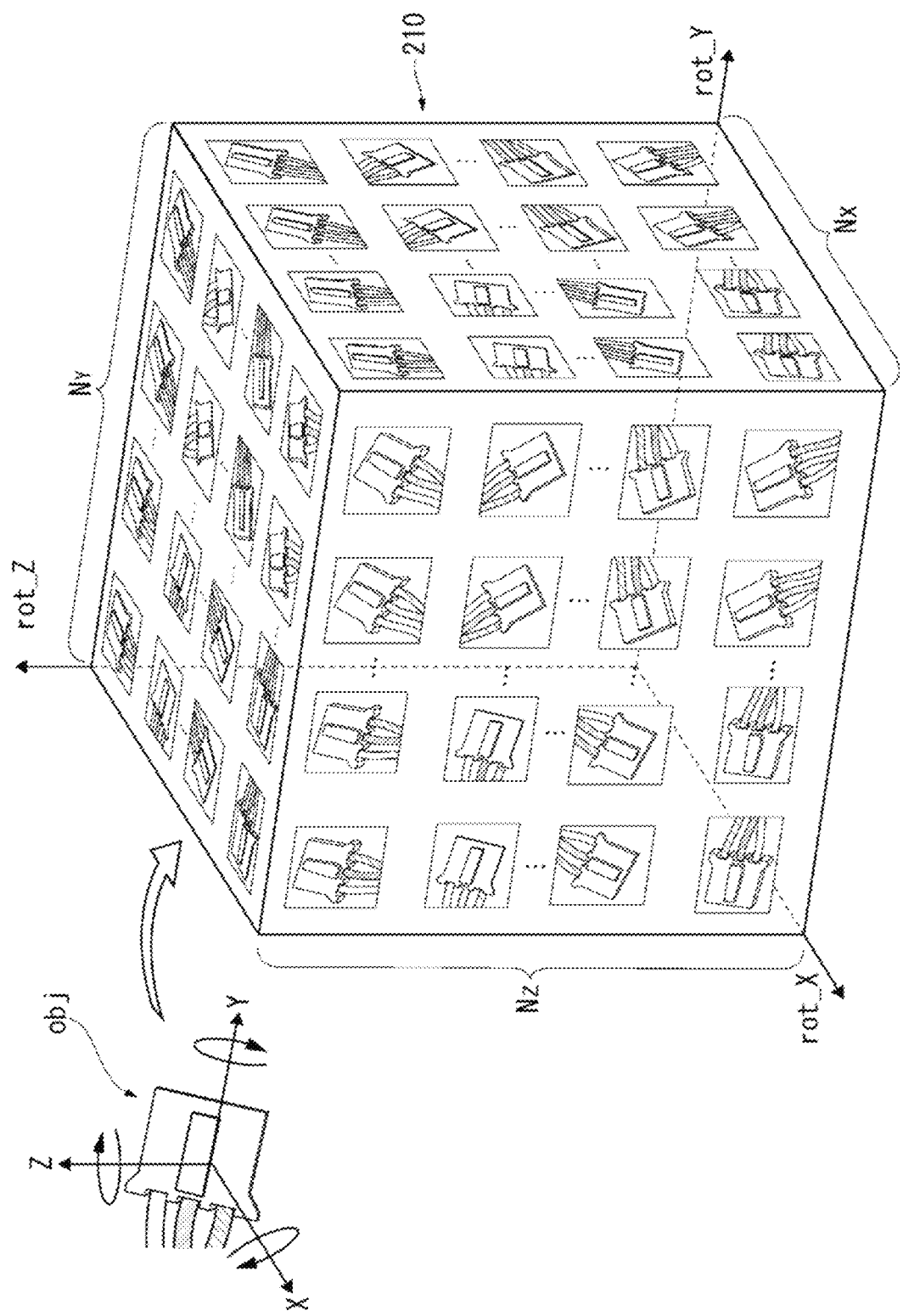
FIG. 5 is a conceptual diagram for describing dictionary data generated in the first embodiment of the present invention.

FIG. 5 is a conceptual diagram for describing the dictionary data generated in the first embodiment of the present invention. FIG. 5 illustrates the dictionary data 210 associated with the object obj (connector in the illustrated example) specified by certain identification information. In the illustrated example, the angle of the object obj is a vector quantity indicated by the amount of rotation about three axes (X-axis, Y-axis, and Z-axis) of the orthogonal coordinate system in the three-dimensional space. As for the angle of the object obj, the dictionary data 210 includes at least $N_X \times N_Y \times N_Z$ elements defined by dividing the entire circumference into $N_X$ elements regarding the amount of rotation (rot_X) about the X-axis, dividing the entire circumference into $N_Y$ elements regarding the amount of rotation (rot_Y) about the Y-axis, and dividing the entire circumference into $N_Z$ elements regarding the amount of rotation (rot_Z) about the Z-axis. Each element is associated with information corresponding to at least one image of the object obj. Here, the information corresponding to the image of the object obj can be, for example, an amount of features extracted from the image captured by the camera 150 when the object obj is at an angle indicated by the amount of rotation (rot_X, rot_Y, rot_Z).

Note that in the example, the division widths of the amount of rotation (rot_X, rot_Y, rot_Z) about the axes may be different (that is, at least one of $N_X$, $N_Y$, and $N_Z$ may be different from others). In addition, the amount of rotation may not be equally divided. For example, in a case where there is an angle unlikely to be estimated with high reliability in the estimation of the angle of the object obj described later, the division width of the amount of rotation near the amount of rotation corresponding to the angle may be set smaller than the division width of the other parts.

For example, in a case where the camera 310 of the robot 300 captures an image of the object obj at an unknown angle, the amount of features extracted from the captured image and the amount of features associated with the element of the dictionary data 210 can be matched to estimate the angle of the object obj.

Here, the dictionary data 210 may include a plurality of elements generated based on the angle information of the same object obj and a plurality of different images. In this case, the number of elements of the dictionary data 210 is larger than $N_X \times N_Y \times N_Z$. The environmental conditions in capturing the plurality of images may vary between the plurality of images associated with the same angle information, for example. The environment conditions can be, for example, the arrangement of the background or the light. Generating the dictionary data 210 under a plurality of different environmental conditions can provide the dictionary data 210 that can estimate the angle of the object obj under various environmental conditions.

In the case described above, the image acquisition unit 110 of the terminal 100 acquires a plurality of different images of the object obj. For example, the image acquisition unit 110 may acquire images of the object obj when the control unit 167 of the platform device 160 sets the same angle before and after the background of the object obj is exchanged by using the background plate 174 of the jig 170. In this case, the dictionary data generation unit 130 generates a plurality of elements of the dictionary data 210 based on the plurality of images with different backgrounds, the identification information of the object obj common to the plurality of images, and the angle information indicating the angle of the object obj common to the plurality of images.

(Configuration of Robot)

Figure 6:
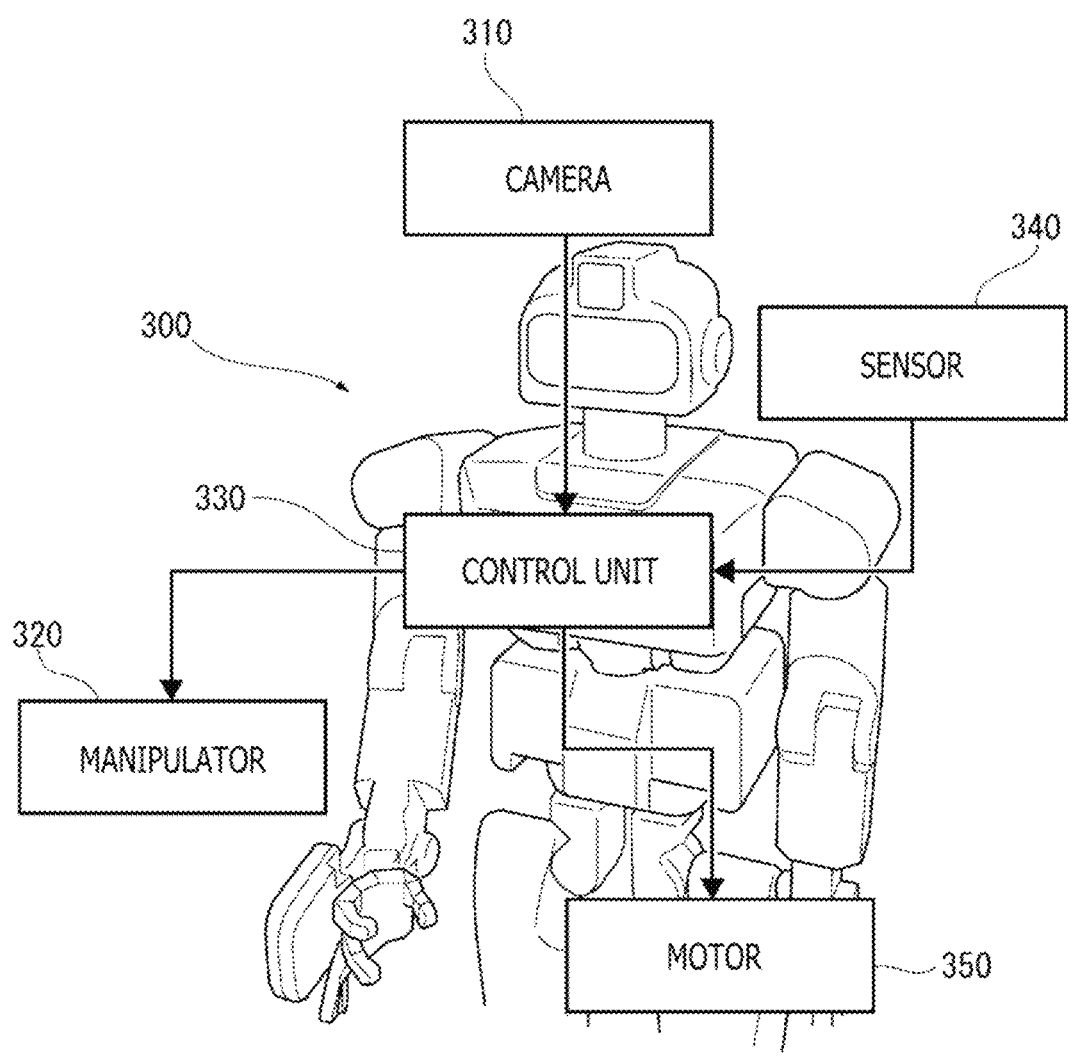
FIG. 6 is a diagram for describing a schematic configuration of a robot in the system illustrated in FIG. 1.

FIG. 6 is a diagram for describing a schematic configuration of the robot 300 in the system illustrated in FIG. 1. With reference to FIG. 6, the robot 300 includes the camera 310, the manipulator 320, a control unit 330, a sensor 340, and a motor 350. The robot 300 can, for example, use the manipulator 320 to hold the object obj and use the camera 310 to capture the image of the object obj according to the control of the control unit 330. In the present embodiment, the manipulator 320 is also an example of the holding means for holding the object obj, similar to the platform device 160. The control unit 330 is realized by, for example, a hardware configuration of an information processing apparatus described later.

The sensor 340 includes sensors for acquiring various measurement values used by the robot 300 or transmitted from the robot 300 to another apparatus. Specifically, the sensor 340 may include an acceleration sensor, an angular velocity sensor, a geomagnetic sensor, and/or a global navigation satellite system (GNSS) receiver. The sensor 340 may also include a laser range scanner, such as a depth sensor and laser imaging detection and ranging (LIDAR).

The motor 350 activates each component of the robot 300 according to the control of the control unit 330. The motor 350 may include, for example, a motor (actuator) for activating a joint structure (not illustrated) to change the posture of the robot 300 or move the robot 300. The motor 350 may also include a motor for rotating a wheel to move the robot 300. Note that the configuration of each component of the robot 300 including the motor 350 can be an appropriate configuration based on an already known method of designing the robot. Here, the robot 300 may not change the posture or may not move. Similarly, the robot 300 may not include the joint structure (other than the manipulator 320) or may not include the wheel.

(Configuration for Estimating Angle of Object)

Figure 7:
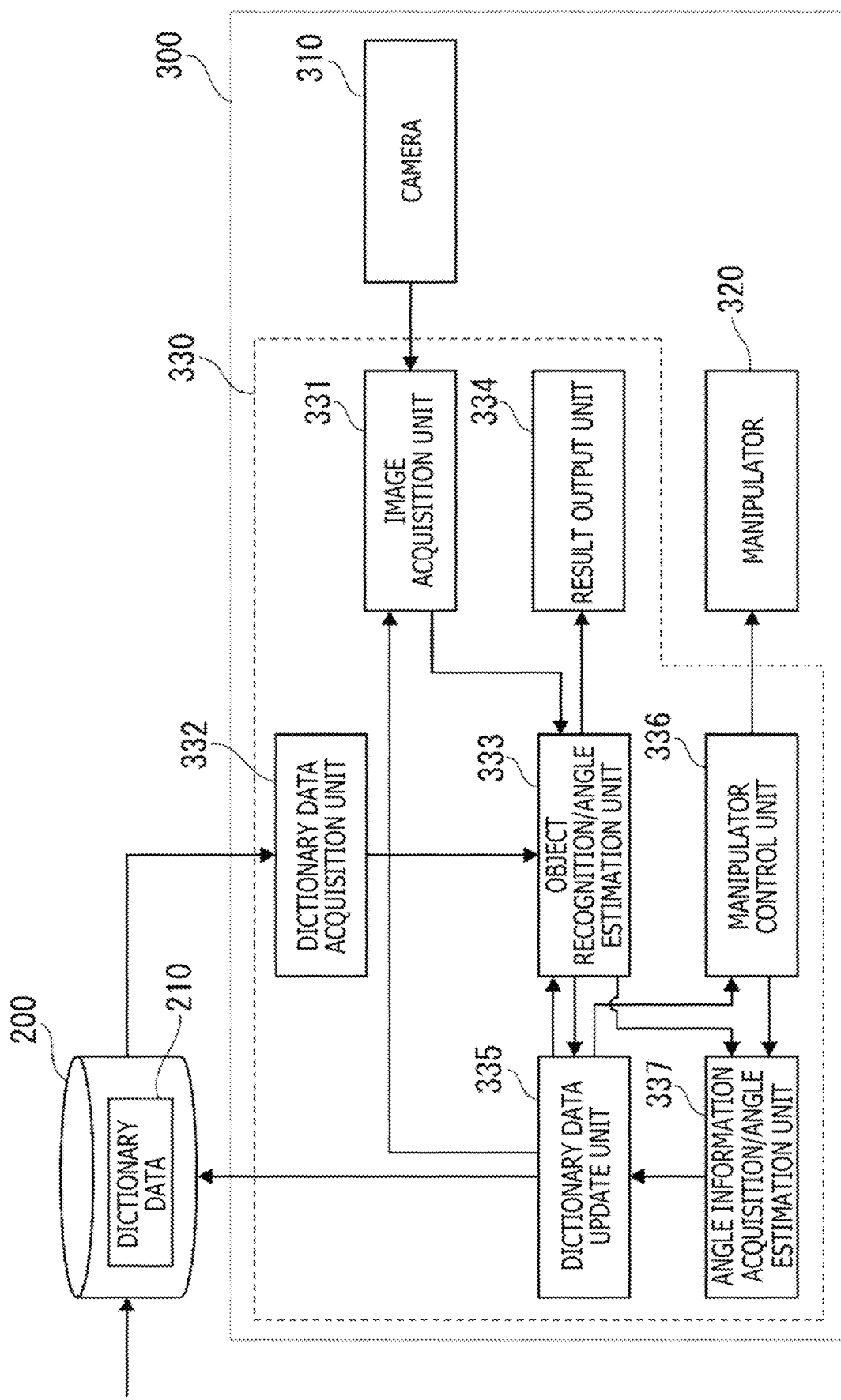
FIG. 7 is a block diagram illustrating a functional configuration of the robot in the system illustrated in FIG. 1.

FIG. 7 is a block diagram illustrating a functional configuration of the robot 300 in the system illustrated in FIG. 1. With reference to FIG. 7, the robot 300 includes, in addition to the camera 310 and the manipulator 320, an image acquisition unit 331, a dictionary data acquisition unit 332, an object recognition/angle estimation unit 333, a result output unit 334, a dictionary data update unit 335, a manipulator control unit 336, and an angle information acquisition/angle estimation unit 337. The components other than the camera 310 and the manipulator 320 are realized by, for example, a processor of an information processing apparatus that realizes the control unit 330 of the robot 300. Note that in a case where the control unit 330 includes a plurality of processors, the plurality of processors may cooperate to realize the functions of the components. In addition, as described later, part or all of the functions realized by the processor of the control unit 330 can also be realized by a server. Hereinafter, the functions of the components will be described. Note that the functions regarding the update of the dictionary data will be described in detail later with reference to a flow chart, and the functions will be just simply described here.

The image acquisition unit 331 acquires the image of the object obj captured by the camera 310. Here, in the present embodiment, the camera 310 is also an example of the imaging apparatus that captures the image of the object, similar to the camera 150. Although the image captured by the camera 150 and the image captured by the camera 310 include the same type of object obj, the images are different from each other. Specifically, the camera 310 is, for example, a digital camera including an image sensor, and the image acquisition unit 331 receives image data generated by the camera 310. For example, the robot 300 uses the manipulator 320 to hold the object obj. In this case, the image acquired by the image acquisition unit 331 includes the object obj held by the manipulator 320. Alternatively, the image acquisition unit 331 may include the object obj not held by the manipulator 320, but placed on a table, a floor, or the like. Although the camera 310 is built in the robot 300, and the camera 310 transmits image data to the image acquisition unit 331 through a bus in the illustrated example, the camera 310 may be externally connected to the robot 300 through a wired communication interface or a wireless communication interface.

The dictionary data acquisition unit 332 acquires the dictionary data 210 from the database 200 connected to the robot 300 through the network. As described above, the dictionary data 210 is generated based on the image and the angle information of the object obj (as well as the identification information of the object obj). The robot 300 uses the dictionary data 210 to estimate the angle of the object obj held by the manipulator 320. Note that the dictionary data acquisition unit 332 may not acquire the entire dictionary data 210. For example, in a case where the dictionary data 210 is generated for a plurality of types of objects, and the object obj included in the image acquired by the image acquisition unit 331 is already identified, the dictionary data acquisition unit 332 selectively acquires the element associated with the identification information of the object obj in the dictionary data 210.

The object recognition/angle estimation unit 333 estimates the angle of the object obj in the image based on the image of the object obj acquired by the image acquisition unit 331 and the dictionary data 210 acquired by the dictionary data acquisition unit 332. In a case where the dictionary data 210 is generated for a plurality of types of object, and the object obj included in the image acquired by the image acquisition unit 331 is not identified, the object recognition/angle estimation unit 333 uses image-based object recognition to specify the identification information of the object obj. An already known technique can be applied for the image-based object recognition, and the details will not be described. For example, in a case where the dictionary data 210 is generated for a single type of object, or in a case where the object obj included in the image acquired by the image acquisition unit 331 is already identified, the object recognition/angle estimation unit 333 does not execute the object recognition.

On the other hand, the object recognition/angle estimation unit 333 estimates the angle of the object obj by, for example, matching the image acquired by the image acquisition unit 331 with the element of the dictionary data 210. In this case, the angle associated with the element of the dictionary data 210 with the highest score in the matching is estimated as the angle of the object obj in the image. As described later, the dictionary data 210 for estimating the angle of the object obj may include a large number of elements. Therefore, the object recognition/angle estimation unit 333 may prune the dictionary data 210 based on the image acquired by the image acquisition unit 331 and may match the pruned dictionary data 210 with the image. Here, in the present embodiment, the pruning is a process of determining the dictionary data 210 to be excluded from the matching through a process with a lower processing load than the matching for estimating the angle of the object obj.

The result output unit 334 outputs a result recognized by the object recognition/angle estimation unit 333. Although the robot 300 may use the estimation result of the angle of the object obj for the operation of the robot 300, such as for controlling the manipulator 320 as described above, the robot 300 may also output the estimation result in a certain form if necessary. More specifically, for example, the estimation result may be displayed as an image on a display of the robot 300 or may be output as a sound from a speaker. In addition, the estimation result may be transmitted from a communication apparatus included in the robot 300 to another apparatus through the network. The result output unit 334 controls the output of the estimation result. Note that in a case where the estimation result does not have to be output, the result output unit 334 is not provided.

The dictionary data update unit 335 updates the dictionary data 210 according to the result of the estimation of the angle of the object obj estimated by the object recognition/angle estimation unit 333 and a result of re-estimation of the angle re-estimated by the angle information acquisition/angle estimation unit 337 described later. More specifically, the dictionary data update unit 335 updates the dictionary data 210 based on the result of the re-estimation of the angle re-estimated by the angle information acquisition/angle estimation unit 337 in a case where the reliability of the angle estimated by the object recognition/angle estimation unit 333 does not exceed a threshold. Note that in the following description, the estimation function of the angle estimated by the object recognition/angle estimation unit 333 will also be referred to as a "first angle estimation function," and the re-estimation function of the angle re-estimated by the angle information acquisition/angle estimation unit 337 will also be referred to as a "second angle estimation function." The angle estimation functions may not be carried out independently from each other. For example, as described later, the angle information acquisition/angle estimation unit 337 re-estimates the angle by using the estimation result of the angle estimated by the object recognition/angle estimation unit 333. That is, there is a case where the "first angle estimation function" is individually executed, and there is also a case where the "second angle estimation function" calls the "first angle estimation function."

The manipulator control unit 336 controls the manipulator 320 of the robot 300 holding the object obj. When the dictionary data update unit 335 updates the dictionary data 210, the manipulator control unit 336 controls the manipulator 320 to rotate the object obj. Note that the rotation here denotes changing the angle of the object obj. The rotation of the object obj is an example of a physical operation regarding the object obj executed in the re-estimation of the angle of the object obj.

The angle information acquisition/angle estimation unit 337 acquires angle information indicating the angle of the object obj from the manipulator control unit 336. Here, in the present embodiment, the angle information acquired by the angle information acquisition/angle estimation unit 337 of the robot 300 indicates the angle of the object obj on the basis of the coordinate system of the robot 300 or the manipulator 320. Therefore, in the present embodiment, the angle information acquired from the manipulator control unit 336 may not be directly associated with the angle information of the dictionary data 210. Therefore, in the present embodiment, the angle information acquisition/angle estimation unit 337 calculates an amount of rotation $\Delta\theta$ of the object obj from the angle information before and after the manipulator control unit 336 controls the manipulator 320 to rotate the object obj, and the amount of rotation $\Delta\theta$ is used for the re-estimation of the angle described later.

The angle information acquisition/angle estimation unit 337 further re-estimates an angle $\theta_1$ of the object obj in an image (first image) before the rotation of the object obj based on an angle $\theta_2$ of the object obj estimated by the object recognition/angle estimation unit 333 on the basis of an image (second image) and the dictionary data 210 after the rotation of the object obj and based on the amount of rotation $\Delta\theta$ (simply put, $\theta_1=\theta_2-\Delta\theta$). Here, the amount of rotation $\Delta\theta$ is an example of an amount of physical operation regarding the object obj. Note that each of the angle $\theta_1$, the angle $\theta_2$, and the amount of rotation $\Delta\theta$ can be, for example, a vector quantity including elements of the rotation (rot_X, rot_Y, and rot_Z in the example of FIG. 5) about each axis of the coordinate system.

In a case where the reliability of the angle $\theta_2$ of the object obj estimated by the object recognition/angle estimation unit 333 based on the image (second image) and the dictionary data 210 after the rotation of the object obj exceeds a threshold, the dictionary data update unit 335 updates the dictionary data 210 based on the angle information indicating the angle $\theta_1$ re-estimated by the angle information acquisition/angle estimation unit 337 on the basis of the angle $\theta_2$ and based on the image (first image) before the rotation of the object obj.

On the other hand, in a case where the reliability of the angle $\theta_2$ of the object obj estimated by the object recognition/angle estimation unit 333 based on the image (second image) and the dictionary data 210 after the rotation of the object obj does not exceed the threshold, the manipulator control unit 336 controls the manipulator 320 to further rotate the object obj by an amount of rotation $\Delta\theta'$, and the object recognition/angle estimation unit 333 estimates an angle $\theta_3$ of the object obj based on an image (third image) and the dictionary data 210 after the rotation of the object obj. In a case where the reliability of the angle $\theta_3$ exceeds the threshold, the angle information acquisition/angle estimation unit 337 re-estimates the angle $\theta_1$ based on the angle $\theta_3$ and a total amount of rotation ($\Delta\theta+\Delta\theta'$), and the dictionary data update unit 335 updates the dictionary data 210 based on the result of the re-estimation.

In this way, once the angle $\theta_1$ is re-estimated with sufficient reliability, the dictionary data update unit 335 updates the dictionary data 210 based on the angle $\theta_1$ and the image (first image) before the rotation of the object obj. Specifically, the dictionary data update unit 335 adds or replaces the elements of the dictionary data 210. As a result, when the camera 310 later captures an image of the object obj at the angle $\theta_1$ under similar environmental conditions, the angle $\theta_1$ is likely to be estimated with high reliability without the re-estimation.

(Example of Processing Flow)

Hereinafter, an example of a processing flow in the system 10 according to the present embodiment will be described with reference to FIGS. 8 to 12.

Figure 8:
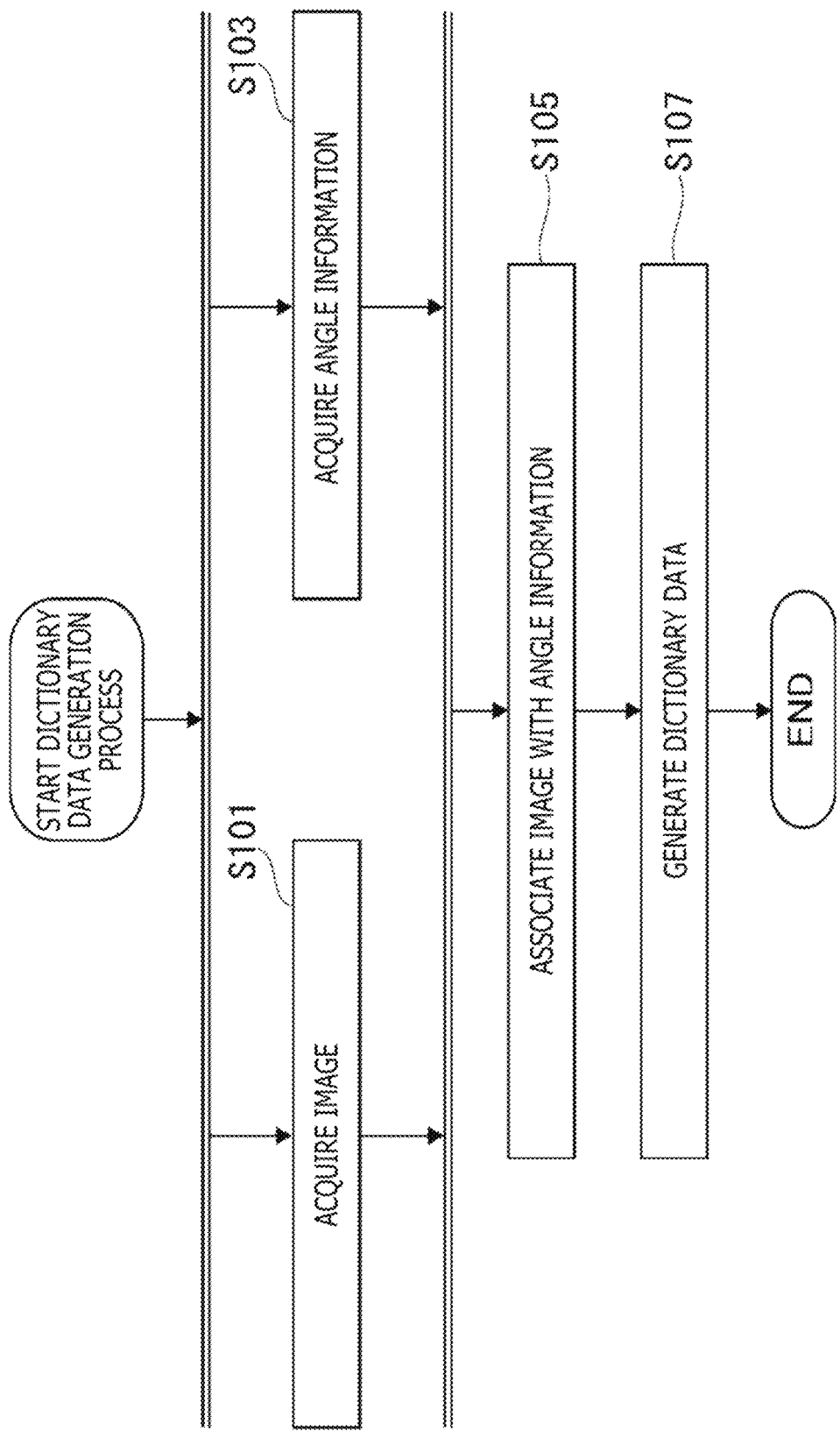
FIG. 8 is a flow chart illustrating an example of a dictionary data generation process in the first embodiment of the present invention.

FIG. 8 is a flow chart illustrating an example of a dictionary data generation process according to the first embodiment of the present invention. With reference to FIG. 8, in a registration process, the image acquisition unit 110 of the terminal 100 first acquires the image (S101), and the angle information acquisition unit 120 acquires the angle information (step S103). Either one of steps S101 and S103 may be executed first, or steps S101 and S103 may be executed in parallel. For example, the angle information acquisition unit 120 may acquire the angle information from the platform device 160 once the image acquisition unit 110 acquires in real time the image captured by the camera 150. In addition, the image acquisition unit 110 may acquire in real time the image captured by the camera 150 once the angle information acquisition unit 120 transmits the angle information to the platform device 160. Alternatively, the image acquisition unit 110 may continuously acquire in chronological order the images captured by the camera 150, and the angle information acquisition unit 120 may continuously acquire in chronological order the angle information set in the platform device 160.

Next, the dictionary data generation unit 130 of the terminal 100 associates the image acquired in step S101 with the angle information acquired in step S103. For example, in a case where both of the image and the angle information are acquired in real time, the dictionary data generation unit 130 associates the image and the angle information acquired at substantially the same time. On the other hand, in a case where the image and the angle information are acquired with a time lag or acquired later, the dictionary data generation unit 130 associates the image and the angle information including a common key. The key in this case may be, for example, a time stamp or may be a sequence number or the like allocated separately from the time stamp.

Next, the dictionary data generation unit 130 generates the dictionary data 210 based on the image and the angle information associated with each other in step S105 (step S107). Here, as already described, the dictionary data generation unit 130 may apply an already known technique of image-based object recognition to generate the dictionary data 210. Furthermore, in a case where, for example, the dictionary data generation unit 130 continuously acquires sets of substantially the same image and angle information, the dictionary data generation unit 130 may determine that the information is redundant and skip the generation of the dictionary data 210.

Figure 9:
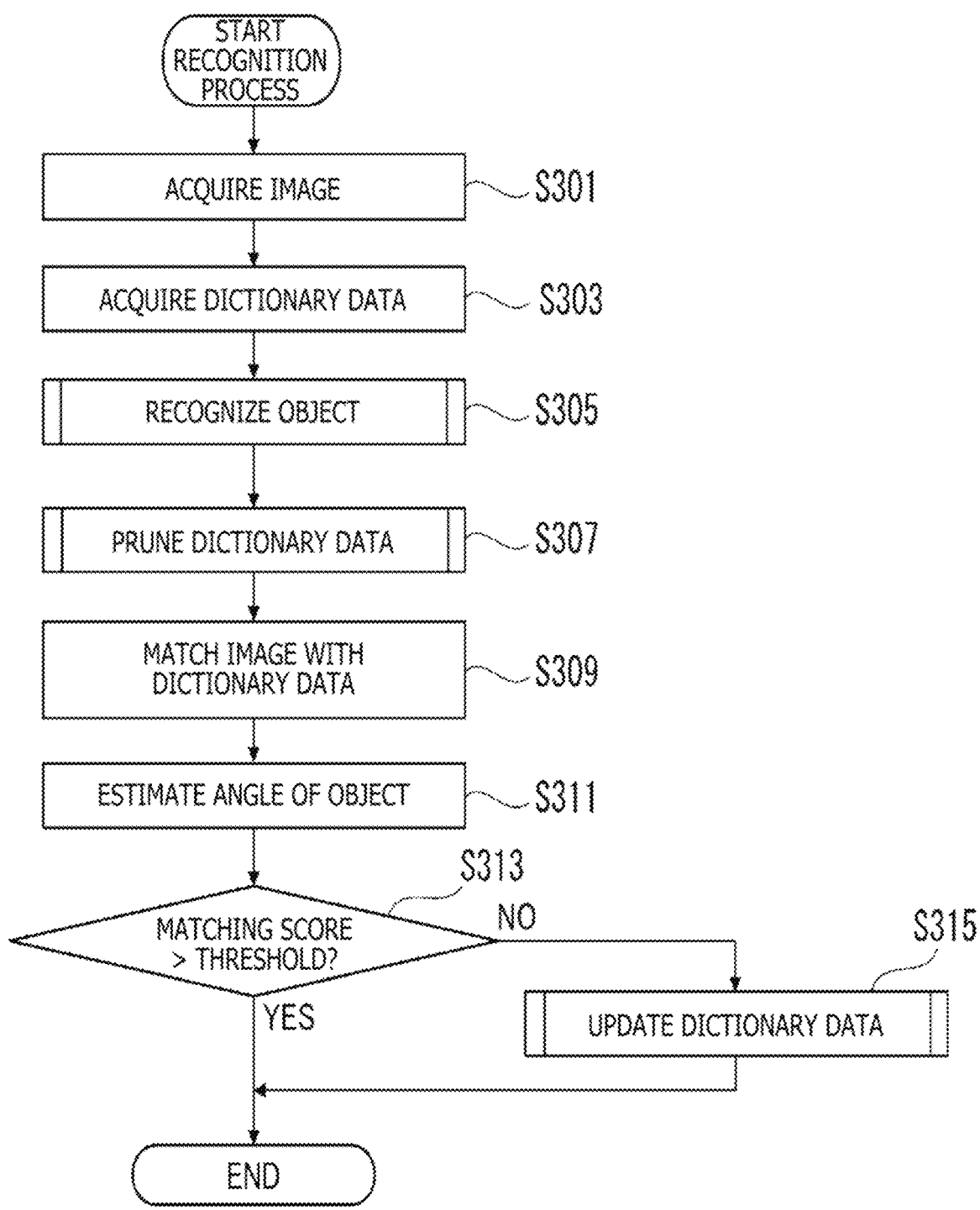
FIG. 9 is a flow chart illustrating an example of a recognition process in the first embodiment of the present invention.

FIG. 9 is a flow chart illustrating an example of a recognition process in the first embodiment of the present invention. With reference to FIG. 9, the image acquisition unit 331 of the robot 300 first acquires the image in the recognition process (step S301). As described above, the image acquisition unit 331 acquires the image captured by the camera 310, and the image includes, for example, the object obj held by the manipulator 320. Next, the dictionary data acquisition unit 332 acquires the dictionary data 210 from the database 200 (step S303).

Next, the object recognition/angle estimation unit 333 recognizes the object obj based on the image acquired in step S301 and the dictionary data 210 acquired in step S303 (step S305). Note that an already known technique can be applied for the image-based object recognition, and the details will not be described. Furthermore, as described above, in the case where, for example, the dictionary data 210 is generated for a single type of object, or in the case where the object obj included in the image is already identified, the object recognition of step S305 is skipped.

Next, the object recognition/angle estimation unit 333 prunes the dictionary data 210 (step S307). For example, in a case where the dictionary data 210 as illustrated in FIG. 5 is generated by dividing the entire circumference into 52 elements regarding the amount of rotation (rot_X, rot_Y, rot_Z) about each axis (that is, $N_X=N_Y=N_Z=52$), the generated dictionary data 210 includes at least $52^3=140{,}608$ elements. The number of elements becomes larger in the case where a plurality of different images are associated with the same angle to generate the dictionary data 210 as described above. The processing load for matching all of the elements of the dictionary data 210 is enormous, and the benefit of pruning the dictionary data 210 is large.

Figure 10:
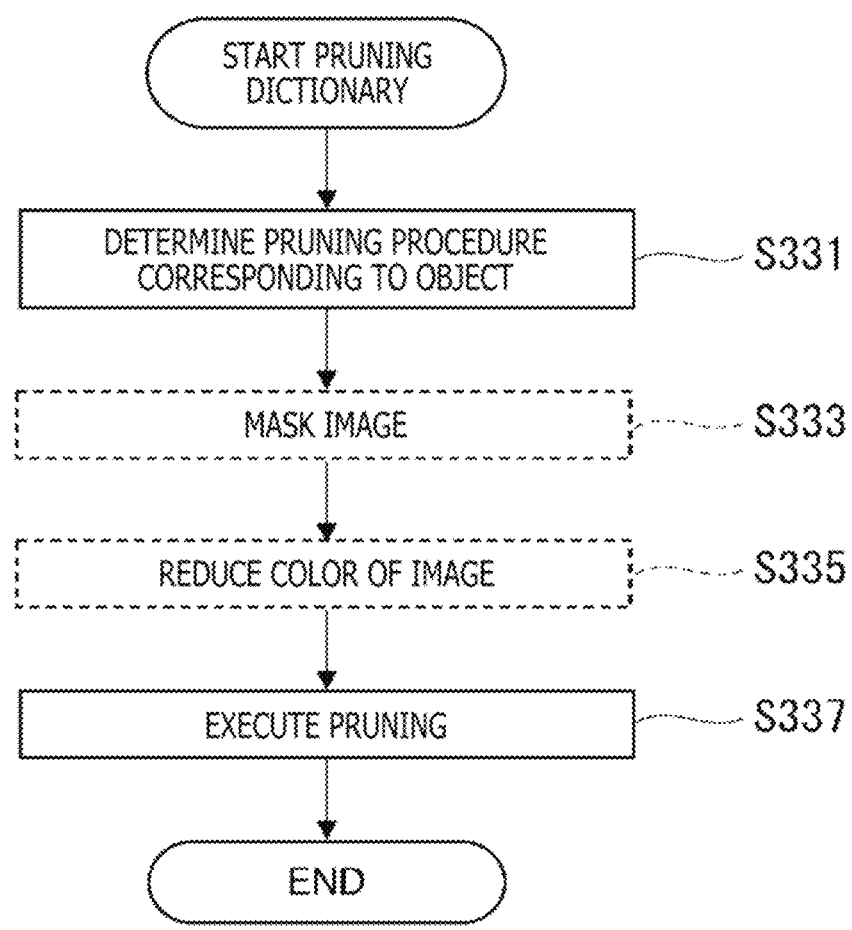
FIG. 10 is a flow chart illustrating an example of a pruning process in the first embodiment of the present invention.
Figure 11:
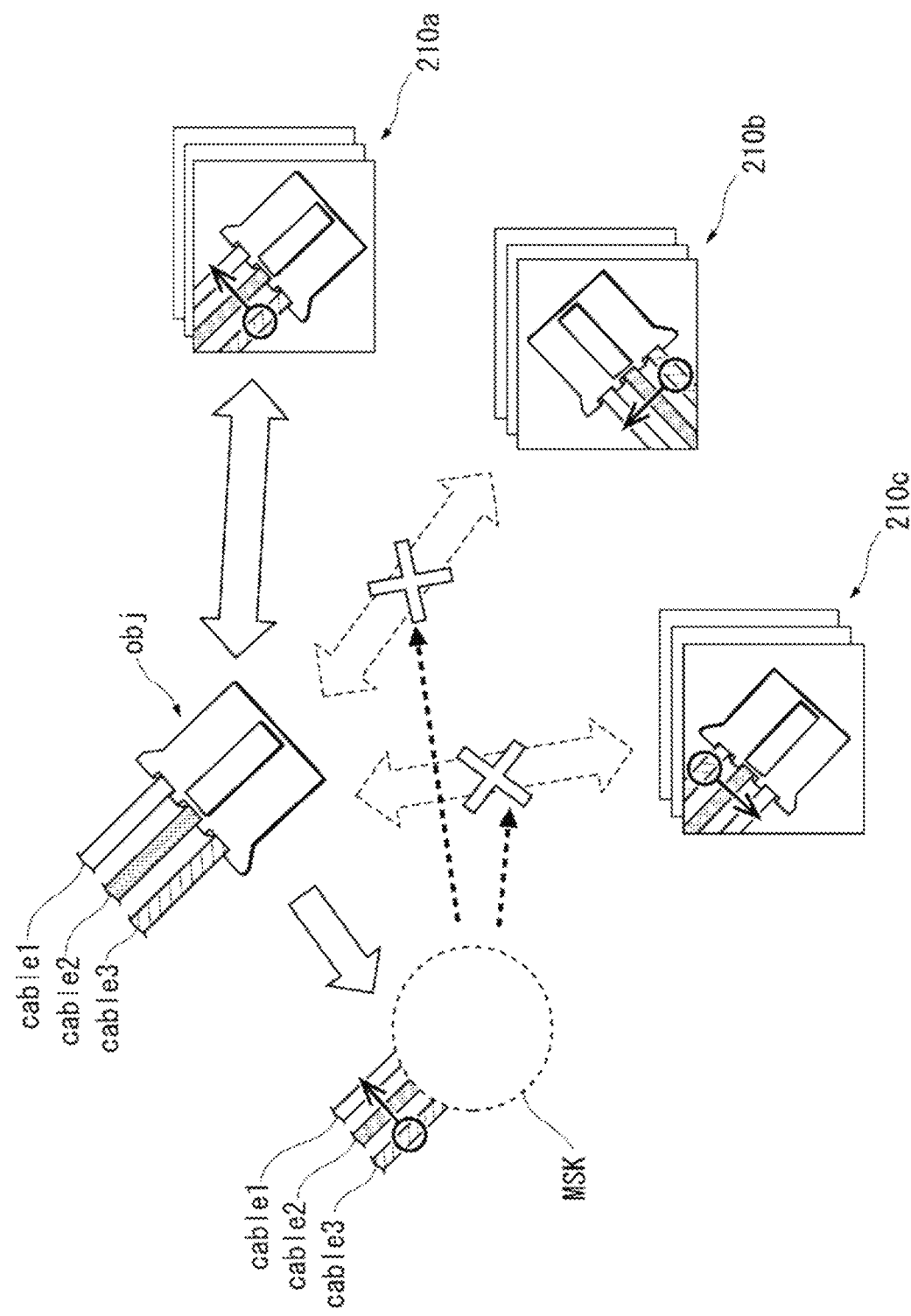
FIG. 11 is a conceptual diagram for describing the pruning process illustrated in FIG. 10.

FIG. 10 is a flow chart illustrating an example of the pruning process in the first embodiment of the present invention. FIG. 11 is a conceptual diagram for describing the pruning process illustrated in FIG. 10. With reference to FIG. 10, the object recognition/angle estimation unit 333 first determines a pruning procedure corresponding to the object obj (step S331). The pruning procedure corresponding to the object obj is, for example, set in advance and stored in the database 200 along with the dictionary data 210. In the case where step S305 illustrated in FIG. 9 is executed, the object recognition/angle estimation unit 333 determines the pruning process according to the recognition result of the object in step S305.

The following steps S333 and S335 are an example of a process executed according to the pruning procedure corresponding to the object obj in the example illustrated in FIG. 11. The process executed here may vary depending on the type of object. In the example, the object recognition/angle estimation unit 333 masks the image (step S333) and further reduces the color of the image (step S335). Next, the object recognition/angle estimation unit 333 executes the pruning (step S337). In the illustrated example, for example, a plurality of feature parts are extracted from the masked image with reduced color, and elements in the dictionary data 210 in which the positional relationship between a plurality of similarly extracted feature parts is not in common with the image are removed from the target of matching.

In the example illustrated in FIG. 11, the object obj is a connector. The pruning procedure set in the illustrated example focuses on the color of cables (cable 1 to cable 3). In step S333 illustrated in FIG. 10, parts other than the cables in the image are masked (the mask is indicated as MSK in FIG. 11). This removes the influence of the shadow of a terminal cover existing in the masked part. Furthermore, although not expressed in FIG. 11, the color of the image is reduced in step S335 such that the difference in the color of the cables at both edges (cable 1 and cable 3) is expressed. This allows to easily extract the cables at both edges (cable 1 and cable 3) as two feature parts in each element of the image and the dictionary data 210.

Furthermore, in step S337 illustrated in FIG. 10, the dictionary data 210 is pruned based on the masked image with reduced color. Specifically, for example, cable 1 is positioned on the upper right as viewed from cable 3 in the image. On the other hand, cable 1 is positioned on the upper left as viewed from cable 3 in an element group 210b (connector is rotated about the viewing axis) of the dictionary data 210. In addition, cable 1 is positioned on the lower left as viewed from cable 3 in an element group 210c (connector is reversed). Therefore, the element groups 210b and 210c are removed from the target of matching in step S337. As a result, the matching is executed only for an element group 210a (as in the image, cable 1 is positioned on the upper right as viewed from cable 1).

Returning to FIG. 9, after the pruning of the dictionary data 210 in step S307, the object recognition/angle estimation unit 333 matches the image with the dictionary data 210 (step S309). The matching may be, for example, template matching. Note that an already known technique can be applied for the matching of image, and the details will not be described. Note that although the scores on the basis of objects are calculated as results of matching in the already known image-based object recognition, scores on the basis of angles of objects are calculated in step S307.

Next, the object recognition/angle estimation unit 333 estimates the angle of the object obj based on the result of the matching in step S309 (S311). The estimation result in step S311 may be, for example, an angle indicated by angle information associated with the element of the dictionary data 210 with the highest score calculated in the matching in step S309.

Next, the object recognition/angle estimation unit 333 determines whether or not the score calculated in the matching in step S309 exceeds a threshold (step S313). Here, the score compared with the threshold is, for example, the highest matching score. Alternatively, whether or not a certain top percent (for example, 10%) of the matching scores exceeds the threshold may be determined. In a case where the matching score does not exceed the threshold in the determination of step S313 (NO), the dictionary data update unit 335 updates the dictionary data 210 (step S315). On the other hand, in a case where the matching score exceeds the threshold in the determination of step S313 (YES), the process of updating the dictionary data 210 may not be executed. The result of the estimation in step S311 is output by the result output unit 334 as necessary.

Figure 12:
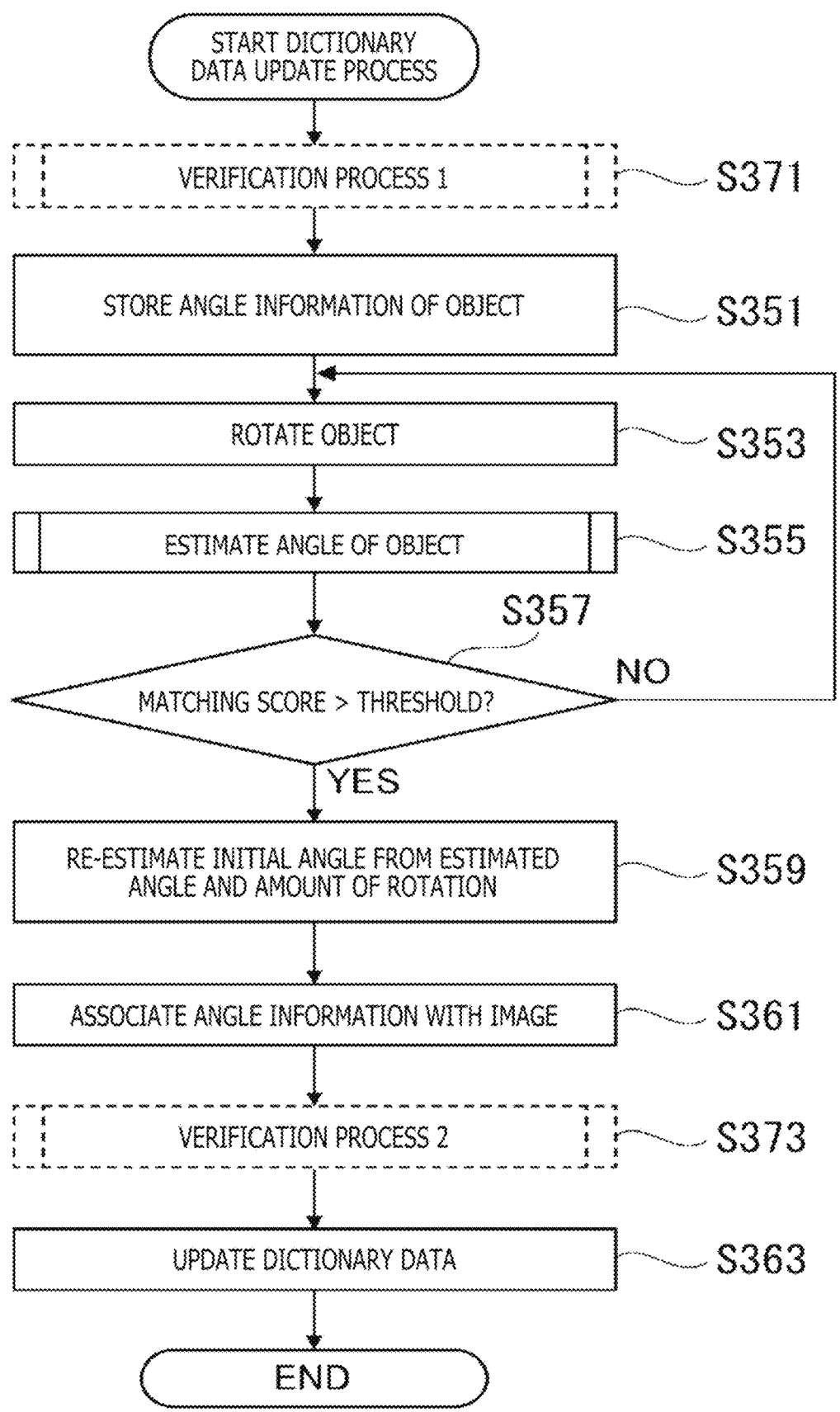
FIG. 12 is a flow chart illustrating an example of a dictionary data update process in the first embodiment of the present invention.

FIG. 12 is a flow chart illustrating an example of the dictionary data update process in the first embodiment of the present invention. With reference to FIG. 12, the angle information acquisition/angle estimation unit 337 of the robot 300 first stores the angle information of the object obj provided from the manipulator control unit 336 in the update process (step S351). Here, the angle stored in step S351 indicates, for example, an angle of the object obj in the coordinate system on the basis of the manipulator 320. Next, the manipulator control unit 336 controls the manipulator 320 to rotate the object obj (step S353).

After the object obj is rotated, the angle of the object obj is estimated (step S355). The process of step S355 corresponds to, for example, the process of steps S301 to S311 illustrated in FIG. 9. Specifically, the image acquisition unit 331 acquires the image (second image) after the rotation of the object obj, and the object recognition/angle estimation unit 333 estimates the angle of the object obj in the image (second image) after the rotation. Note that the dictionary data 210 acquired in step S303 executed earlier may be used, and it may be assumed that the object obj is already recognized in step S305 executed earlier.

Next, the dictionary data update unit 335 determines whether or not the matching score estimated in step S355 exceeds the threshold (step S357). The determination may be executed as in, for example, step S313 illustrated in FIG. 9. In a case where the matching score does not exceed the threshold in the determination of step S357 (NO), the process of step S353 and step S355 is re-executed. That is, the manipulator control unit 336 controls the manipulator 320 to further rotate the object obj (step S353), and the object recognition/angle estimation unit 333 estimates the angle of the object obj in the image (third image) after the rotation (step S355).

On the other hand, in a case where the matching score exceeds the threshold in the determination of step S357 (YES), the angle information acquisition/angle estimation unit 337 re-estimates the initial angle $\theta_1$ from the angle $\theta_2$ estimated in step S355 and the amount of rotation $\Delta\theta$ of the object obj (step S359). Here, the initial angle $\theta_1$ is the angle before the rotation of the object obj and is an angle that cannot be estimated by the object recognition/angle estimation unit 333 with sufficient reliability. On the other hand, the angle $\theta_2$ is the angle of the object obj estimated by the object recognition/angle estimation unit 333 based on the image (second image) and the dictionary data 210 after the rotation of the object obj, and it is proved in the determination of step S357 that the angle is estimated with sufficient reliability. In addition, the amount of rotation Δθ is calculated based on the angle information of the object obj stored in step S351 and the angle information of the object obj provided from the manipulator control unit 336 at the time of step S353.

Note that in a case where the process of steps S353 and S355 is repeated N times as a result of the determination of step S357, the angle information acquisition/angle estimation unit 337 re-estimates the initial angle $θ_1$ from an angle $θ_{N+1}$ estimated in step S355 executed last and a total amount of rotation $Δθ_{TTL}$ of the object obj in step S353 executed N times. The total amount of rotation $Δθ_{TTL}$ is calculated based on the angle information of the object obj stored in step S351 and the angle information of the object obj provided from the manipulator control unit 336 at the time of step S353.

Next, the dictionary data update unit 335 associates the angle information corresponding to the initial angle $θ_1$ re-estimated in step S359 with the image (first image) before the rotation of the object obj acquired in step S301 illustrated in FIG. 9 (step S361). Furthermore, the dictionary data update unit 335 updates the dictionary data 210 based on the image and the angle information associated with each other in step S361 (step S363). Here, the update of the dictionary data 210 includes addition of element of the dictionary data 210 and/or replacement of element of the dictionary data 210.

In step S363 described above, the dictionary data update unit 335 adds the element of the dictionary data 210 based on the image and the angle information. As a result, when the camera 310 of the robot 300 later captures an image of the object obj at the angle $θ_1$ under similar environmental conditions, the angle $θ_1$ is likely to be estimated with high reliability. Note that in a case where, for example, the dictionary data 210 is dedicated to the robot 300, and it is expected that the environmental conditions at the time of the camera 310 capturing the image of the object obj will not be changed, the dictionary data update unit 335 may replace the element of the dictionary data 210 based on the image and the angle information.

The dictionary data 210 can be updated as described above to accumulate the additional dictionary data 210 regarding the angle or the environmental conditions of the object obj for which the estimation with high reliability by using the dictionary data 210 generated first is difficult. In this way, the robot 300 that uses the dictionary data 210 to estimate the angle of the object obj can autonomously strengthen the dictionary data 210 to improve the robustness of the estimation.

(Example of Verification Process Before Update)

Here, the dictionary data update process described with reference to FIG. 12 may include an additional process that is a verification process before the update of the dictionary data 210. For a first example, a process of verifying whether or not to execute the dictionary data update process before step S351 illustrated in FIG. 12 may be executed (illustrated as step S371 "verification process 1"). In the verification process according to the first example, the image acquisition unit 331 reacquires the image of the object obj before the object obj is rotated in step S353. The object recognition/angle estimation unit 333 estimates the angle of the object obj in the reacquired image. In a case where the matching score in the estimation exceeds the threshold (unlike in the estimation in step S311 illustrated in FIG. 9), the dictionary data update process is cancelled, and at least the update of the dictionary data of step S363 is not executed.

For example, in the image acquired by the image acquisition unit 331 in step S301 illustrated in FIG. 9, there may be an unexpected change in the image due to an incidental factor, such as a delay in the focus of the camera 310 or an instantaneous change in the lighting conditions (for example, caused by lightning or flash light), and this may reduce the reliability of the estimation. The verification process as in the first example is effective for preventing the update of the dictionary data 210 based on information with low reproducibility due to an incidental factor.

In addition, for a second example, a process of verifying whether or not to update the dictionary data based on prepared angle information and image may be executed after step S361 illustrated in FIG. 12 (illustrated as step S373 "verification process 2"). In the verification process according to the second example, the dictionary data update unit 335 generates provisional dictionary data based on the angle information and the image associated in step S361. Next, the manipulator control unit 336 controls the manipulator 320 to rotate the object obj, which is opposite to step S353. This causes the object obj to return to the original angle $θ_1$. Furthermore, the image acquisition unit 331 newly acquires the image of the object obj returned to the original angle $θ_1$, and the object recognition/angle estimation unit 333 estimates the angle of the object obj in the image newly acquired by the image acquisition unit 331 based on the provisional dictionary data generated by the dictionary data update unit 335. Here, in a case where the original angle $θ_1$ can be estimated, and the matching score exceeds the threshold, the dictionary data update unit 335 updates the dictionary data 210 of step S363. Otherwise, the dictionary data 210 of step S363 is not updated.

The second example is effective for, for example, preventing the update of the dictionary data 210 not contributing to the improvement in the reliability of the angle estimation. Depending on the environmental conditions at the time that the camera 310 captures the image of the object obj, the reliability of the estimation of the angle in a similar image acquired later may not be improved even when the dictionary data 210 is updated based on the image acquired by the image acquisition unit 331. The verification process as in the second example is effective for preventing an increase in the capacity of the dictionary data 210 due to unnecessary elements that may not contribute to the improvement in the reliability of the angle estimation.

(Other Modifications)

Note that although the angle information acquisition/angle estimation unit 337 re-estimates the angle after the rotation of the object obj in the example, the angle information acquisition/angle estimation unit 337 may re-estimate the angle after the robot 300 is moved by the motor 350 along with the object obj in another example. The environmental conditions at the time that the camera 310 captures the image may be changed by the movement of the robot 300, and the estimation of the angle with high reliability may be possible without rotating the object obj. Note that the configuration for moving the robot 300 is described in more detail in a third embodiment described later.

In addition, the movement of the robot 300 may be combined with the rotation of the object obj. For example, the angle information acquisition/angle estimation unit 337 may re-estimate the angle after moving the robot 300 along with the object obj in a case where sufficient reliability is still not obtained in the re-estimation of the angle after the rotation of the object obj. For example, the process of the re-estimation may be effective in a case where the environmental conditions at the time that the camera 310 captures the image of the object obj are significantly different from the environmental conditions of the camera 150 in generating the dictionary data 210.

The functions of the system 10 according to the present embodiment are realized by dispersing the functions to the terminal 100, the database 200, and the robot 300 in the examples illustrated in FIGS. 1, 2, and 7. In another example, most of the functions of the system 10 may be realized by a server. That is, the functions realized by the processors of the terminal 100 and the robot 300 described in the examples may also be realized by a processor of a server including the database 200. In this case, the terminal 100 transmits the image of the object obj captured by the camera 150 and the angle information of the object obj acquired from the platform device 160 to the server, and the server associates these to generate the dictionary data 210. On the other hand, the robot 300 transmits the image of the object obj captured by the camera 310 to the server, and the server estimates the angle of the object obj based on the image. The robot 300 receives the estimation result of the angle from the server. In a case where the reliability of the estimated angle does not exceed the threshold, the server may ask the robot 300 to rotate the object obj for re-estimating the angle and to acquire the image of the object obj after the rotation. Note that the number of servers realizing the functions may not be one, and a plurality of servers dispersed on the network may realize the functions. In addition, the server realizing the functions may be an apparatus that is separate from the storage including the database 200.

(Second Embodiment)

Next, a second embodiment of the present invention will be described. Note that overlapping description may be omitted by providing common reference signs to the parts with configurations similar to the first embodiment.

Figure 13:
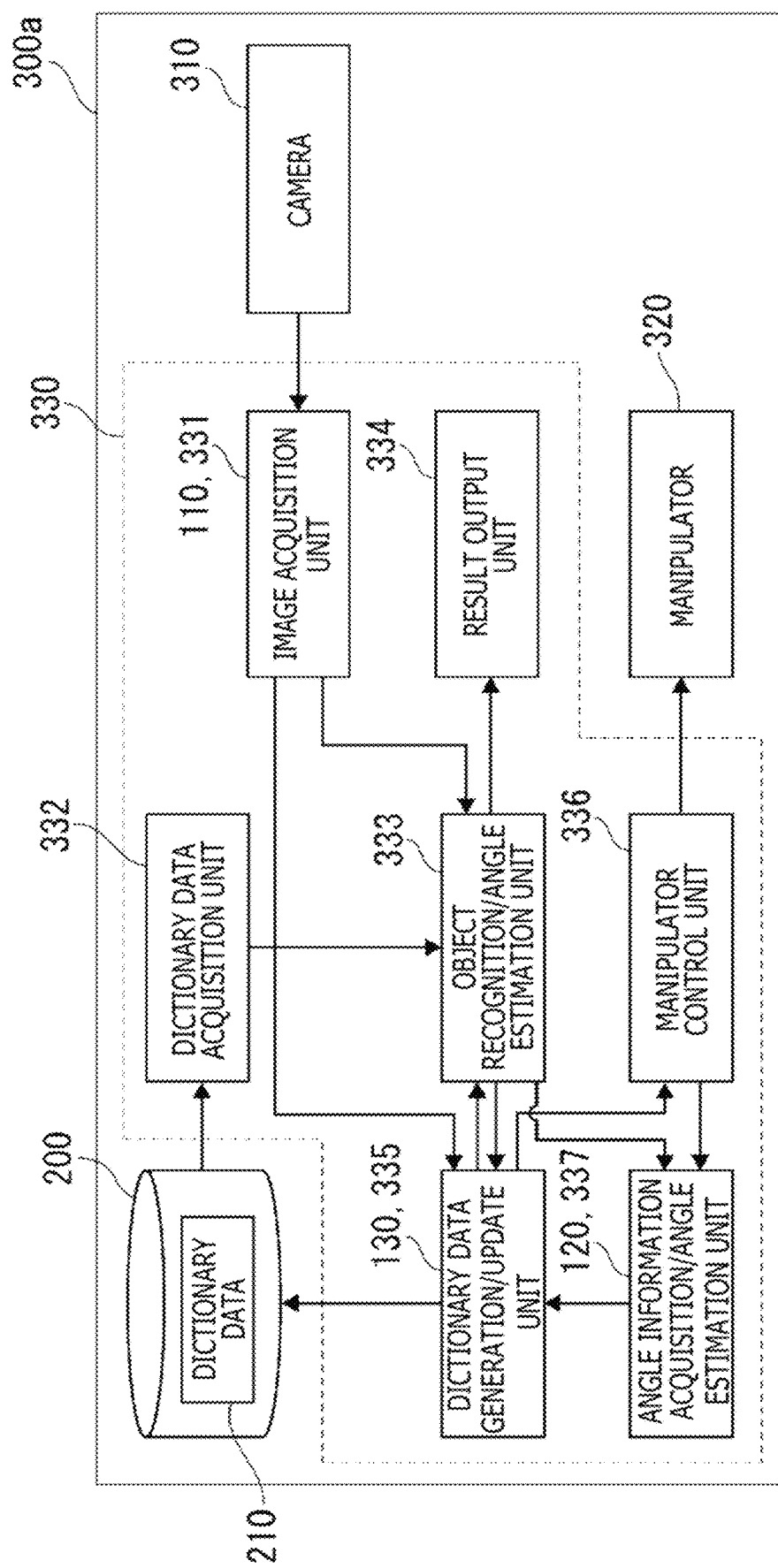
FIG. 13 is a block diagram illustrating a functional configuration of a robot according to a second embodiment of the present invention.

FIG. 13 is a block diagram illustrating a functional configuration of a robot 300a according to the second embodiment of the present invention. With reference to FIG. 13, the entire functions regarding the generation of the dictionary data 210 and the estimation of the angle of the object obj using the dictionary data 210 are realized by the robot 300a in the present embodiment. Specifically, a process of the control unit 330 of the robot 300a realizes the image acquisition units 110 and 331, the angle information acquisition/angle estimation units 120 and 337, dictionary data generation/update units 130 and 335, the dictionary data acquisition unit 332, the object recognition/angle estimation unit 333, the result output unit 334, and the manipulator control unit 336. Note that in a case where the control unit 330 includes a plurality of processors, the plurality of processors may cooperate to realize the functions of the components. In addition, as described later, part or all of the functions realized by the processor of the control unit 330 can also be realized by a server. In addition, the database 200 is stored in the storage of the control unit 330 of the robot 300a. Hereinafter, the components will be further described.

The image acquisition units 110 and 331 have the functions of both of the image acquisition unit 110 described with reference to FIG. 2 and the image acquisition unit 331 described with reference to FIG. 7. That is, the image acquisition units 110 and 331 provide the image of the object obj captured by the camera 310 to the dictionary data generation/update units 130 and 335 in order to generate the dictionary data 210 and provide the image to the object recognition/angle estimation unit 333 in order to use the dictionary data 210 to estimate the angle of the object obj.

The angle information acquisition/angle estimation units 120 and 337 have the functions of both of the angle information acquisition unit 120 described with reference to FIG. 2 and the angle information acquisition/angle estimation unit 337 described with reference to FIG. 7. That is, the angle information acquisition/angle estimation units 120 and 337 provide the angle information acquired from the manipulator control unit 336 to the dictionary data generation/update units 130 and 335 in order to generate the dictionary data 210. Furthermore, the angle information acquisition/angle estimation units 120 and 337 calculate the amount of rotation $\Delta\theta$ of the object obj based on the angle information acquired from the manipulator control unit 336 and further estimate the initial angle $\theta_1$ based on the amount of rotation $\Delta\theta$ and the angle $\theta_2$ estimated by the object recognition/angle estimation unit 333 in order to update the dictionary data 210.

Note that in the present embodiment, the angle information acquired by the angle information acquisition/angle estimation unit 337 of the robot 300 may indicate the angle of the object obj on the basis of the coordinate system of the manipulator 320. In this case, the angle of the object obj indicated by the angle information acquired by the angle information acquisition/angle estimation unit 337 may be changed not only by the amount of rotation of the manipulator 320 set by the manipulator control unit 336, but also by the amounts of operation of the other constituent elements of the robot 300 connected to the manipulator 320, such as arms. In addition, which surface of the object obj is held by the manipulator 320 may also vary from time to time. Therefore, using the dictionary data 210 to estimate the angle of the object obj in the image may be beneficial even when the same manipulator 320 as in the case of generating the dictionary data 210 holds the object obj.

The dictionary data generation/update units 130 and 335 have the functions of both of the dictionary data generation unit 130 described with reference to FIG. 2 and the dictionary data update unit 335 described with reference to FIG. 7. That is, the dictionary data generation/update units 130 and 335 generate the dictionary data 210 based on the image acquired by the image acquisition units 110 and 331 and the angle information acquired by the angle information acquisition/angle estimation units 120 and 337 in order to generate the dictionary data 210. In addition, the dictionary data generation/update units 130 and 335 update the dictionary data 210 according to the results of the estimation of the angle of the object obj estimated by the object recognition/angle estimation unit 333 and the results of the re-estimation of the angle re-estimated by the angle information acquisition/angle estimation units 120 and 337 in order to use the dictionary data 210 to estimate the angle of the object obj.

As illustrated in the second embodiment, the functions of the system 10 according to the first embodiment can be realized by a single apparatus, such as the robot 300a. In this case, it can also be stated that the system 10 is realized by a single apparatus. Similarly, the configuration of the system 10 can be realized by various device configurations. For example, the system 10 may include a plurality of robots 300, and each of the robots 300 may generate the dictionary data 210 and estimate the angle of the object by using the dictionary data 210. In this case, the dictionary data 210 stored in the database 200 is shared by the plurality of robots 300.

In addition, for example, a server including the database 200 may realize the functions realized by the control unit 330 of the robot 300a in the second embodiment. In this case, the robot 300a in generating the dictionary data transmits the image of the object obj captured by the camera 310 and the angle information of the object obj acquired from the manipulator control unit 336 to the server, and the server associates these to generate the dictionary data 210. On the other hand, the robot 300a in estimating the angle transmits the image of the object obj captured by the camera 310 to the server, and the server estimates the angle of the object obj based on the image. The robot 300a receives the estimation result of the angle from the server. The server may also ask the robot 300a to rotate the object obj for re-estimating the angle and to acquire the image of the object obj after the rotation in the case where the reliability of the estimated angle does not exceed the threshold.

(Third Embodiment)

Next, a third embodiment of the present invention will be described. Note that overlapping description will be omitted by providing common reference signs to the parts with configurations similar to the second embodiment.

Figure 14:
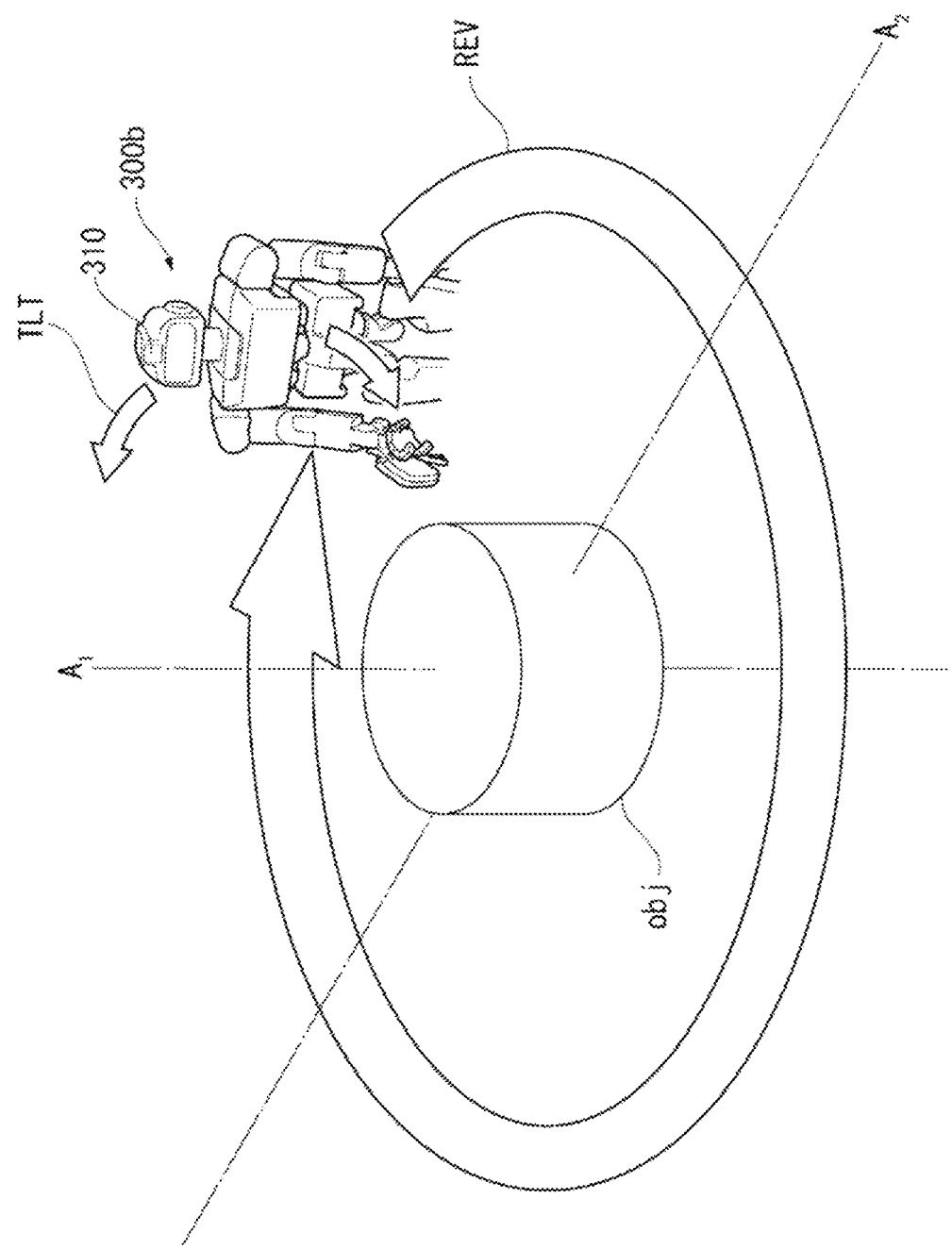
FIG. 14 is a schematic diagram for describing a third embodiment of the present invention.

FIG. 14 is a schematic diagram for describing the third embodiment of the present invention. With reference to FIG. 14, a robot 300b in the present embodiment moves relative to the object obj instead of using the manipulator to hold the object. In the illustrated example, the movement of the robot 300b includes revolving REV around the object. In this case, the object obj rotates about the axis $A_1$ in the images captured by the camera 310. The movement of the robot 300b also includes tilting TLT with respect to the object obj of the camera 310. In this case, the object obj rotates about the axis $A_2$ in the images captured by the camera 310.

Figure 15:
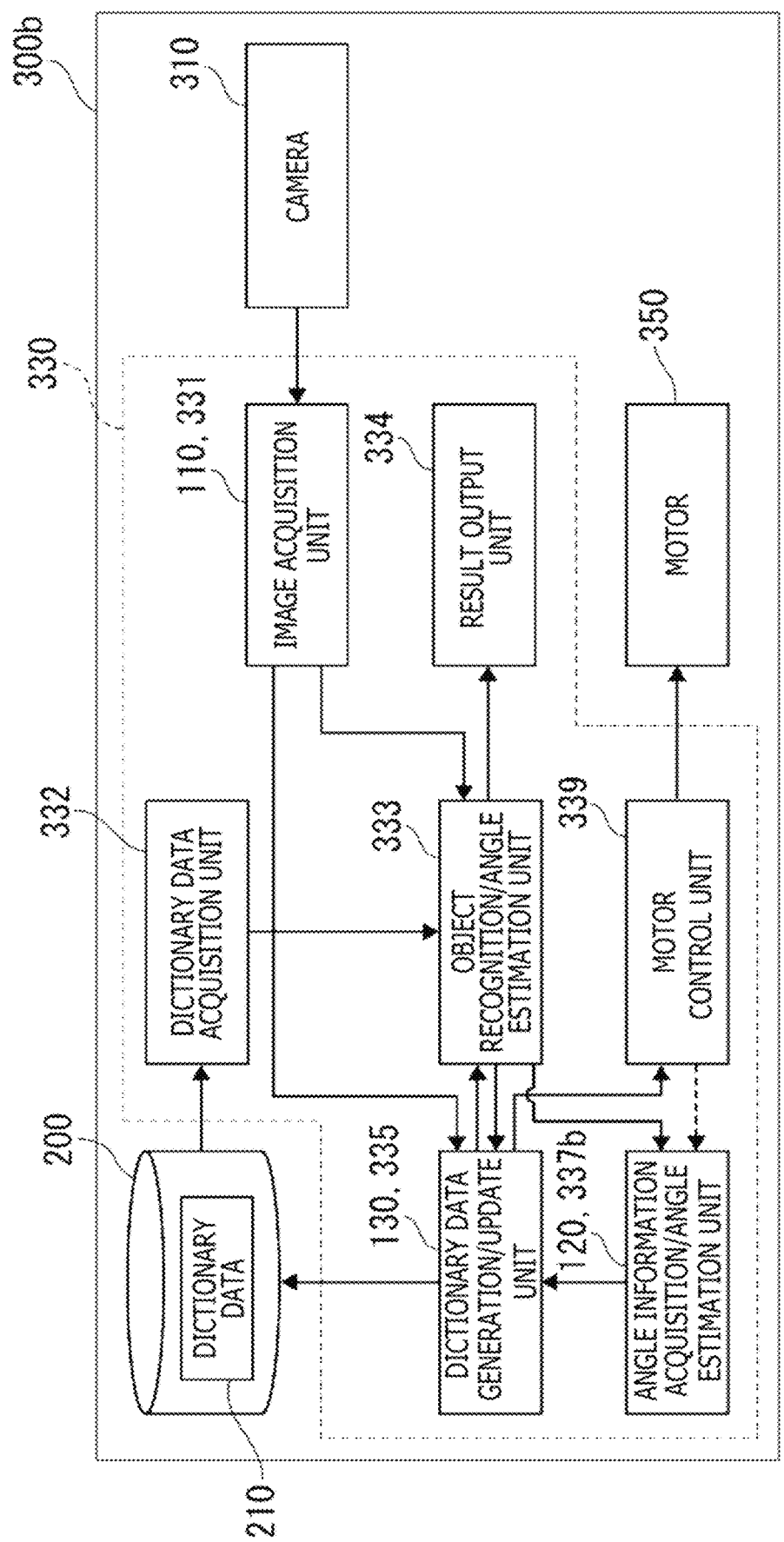
FIG. 15 is a block diagram illustrating a functional configuration of a robot according to the third embodiment of the present invention.

FIG. 15 is a block diagram illustrating a functional configuration of the robot 300b according to the third embodiment of the present invention. The robot 300b according to the present embodiment is different from the robot 300a illustrated in FIG. 13 in that the robot 300b includes a motor control unit 339 that controls the motor 350 in place of the manipulator control unit 336 that controls the manipulator 320.

The motor control unit 339 controls the motor 350 of the robot 300. As described with reference to FIG. 6, the motor 350 includes a motor for activating the joint structure of the robot 300 or rotating the wheel of the robot 300b to thereby move the robot 300b or change the posture of the robot 300b. As described with reference to FIG. 14, the motor control unit 339 controls the motor 350 to revolve the robot 300b around the object obj and/or to tilt the robot 300b with respect to the object obj of the camera 310.

Angle information acquisition/angle estimation units 120 and 337b acquire the angle information indicating the angle of the object obj. Here, the angle information is acquired by, for example, using a plurality of time-series images acquired by the image acquisition unit 331 during the movement of the robot 300 and the camera 310 to execute image-based simultaneous localization and mapping (SLAM). Note that the SLAM may be executed by using measurement results of the other sensor 340 included in the robot 300a, such as a depth sensor and a laser range scanner. In this case, the angle information acquisition/angle estimation units 120 and 337b use the SLAM to specify the amount of movement of the camera 310 and then acquire the angle information of the object obj based on the separately specified positional relationship between the camera 310 and the object obj. Alternatively, the angle information acquisition/angle estimation units 120 and 337b may specify the amount of movement of the camera 310 based on values of the motor 350 controlled by the motor control unit 339.

The present embodiment allows to use the angle information acquired as described above to generate the dictionary data 210. Furthermore, in the case where the object recognition/angle estimation unit 333 cannot estimate the angle with sufficient reliability based on the dictionary data 210, the motor control unit 339 can control the motor 350 to rotate the object obj in the image to thereby re-estimate the angle and update the dictionary data 210. In the present embodiment, the relative movement of the camera 310 with respect to the object obj is an example of a physical operation regarding the object obj executed upon the re-estimation of the angle of the object obj.

According to the configuration of the third embodiment of the present invention described above, the dictionary data 210 for estimating the angle of the object obj can be generated even in a case where the object obj is large or in a case where the object obj is small but cannot be moved. Here, the robot 300b may also include the manipulator 320 and the manipulator control unit 336 as described with reference to FIG. 7 and may use the manipulator 320 to rotate the object obj as in the first and second embodiments in the case where the object obj can be held.

Note that in the example of the third embodiment described above, although the entire functions regarding the generation of the dictionary data 210 and the estimation of the angle of the object obj using the dictionary data 210 are realized by the robot 300b as in the second embodiment, other examples are also possible. For example, the robot 300 in the system 10 according to the first embodiment may include the motor control unit 339 in place of the manipulator control unit 336 or in addition to the manipulator control unit 336.

For example, in a case where the size of the platform device 160 (or the robot 300) used to generate the dictionary data 210 and the size of the robot 300 that uses the dictionary data 210 to estimate the angle of the object obj are different, there may be a case in which although the platform device 160 (or the manipulator 320) can be used to rotate the object obj in order to generate the dictionary data 210, it is difficult to rotate the object obj in updating the dictionary data 210. There may also be the opposite case.

Furthermore, for example, in the case where the robot 300 includes the motor control unit 339 in addition to the manipulator control unit 336 as described above, the motor control unit 339 may control the motor 350 to move the camera 310 along with the object obj. In this case, the manipulator control unit 336 controls the manipulator 320 to prevent the angle of the object obj in the image from changing. Specifically, the manipulator control unit 336 holds the positional relationship between the manipulator 320 and the camera 310 and the angle of the object obj held by the manipulator 320 while the motor control unit 339 controls the motor 350 to move the robot 300.

In this way, the camera 310 can be moved along with the object obj to change, for example, the environmental conditions when the camera 310 captures the image, without changing the angle of the object obj in the image. As a result, in the case where, for example, it is difficult to estimate the angle of the object obj with high reliability based on the dictionary data 210 under certain environmental conditions, the estimation with high reliability may be enabled by changing the environmental conditions. Furthermore, a plurality of elements associating a plurality of images acquired under different environmental conditions with common angle information can be included in the dictionary data 210 in generating the dictionary data 210 to thereby improve the robustness of the estimation of the angle.

In the example, the motor control unit 339 first controls the motor 350 to move the camera 310 along with the object obj in the update process of the dictionary data 210. After the camera 310 and the object obj are moved, the image acquisition unit 331 acquires the image (second image) after the movement of the object obj, and the object recognition/angle estimation unit 333 re-estimates the angle of the object obj in the image (second image) after the movement. In the case where the matching score in the estimation exceeds the threshold, the dictionary data update unit 335 updates the dictionary data based on the angle information corresponding to the angle of the re-estimated object obj and the image (first image) acquired by the image acquisition unit 331 before the movement of the object obj. In the example, the movement of the camera 310 along with the object obj is the physical operation regarding the object obj executed in the re-estimation of the angle of the object obj. Furthermore, in the example, the object recognition/angle estimation unit 333 performs both of the "first angle estimation function" and the "second angle estimation function."

(Example of Hardware Configuration of Information Processing Apparatus)

Figure 16:
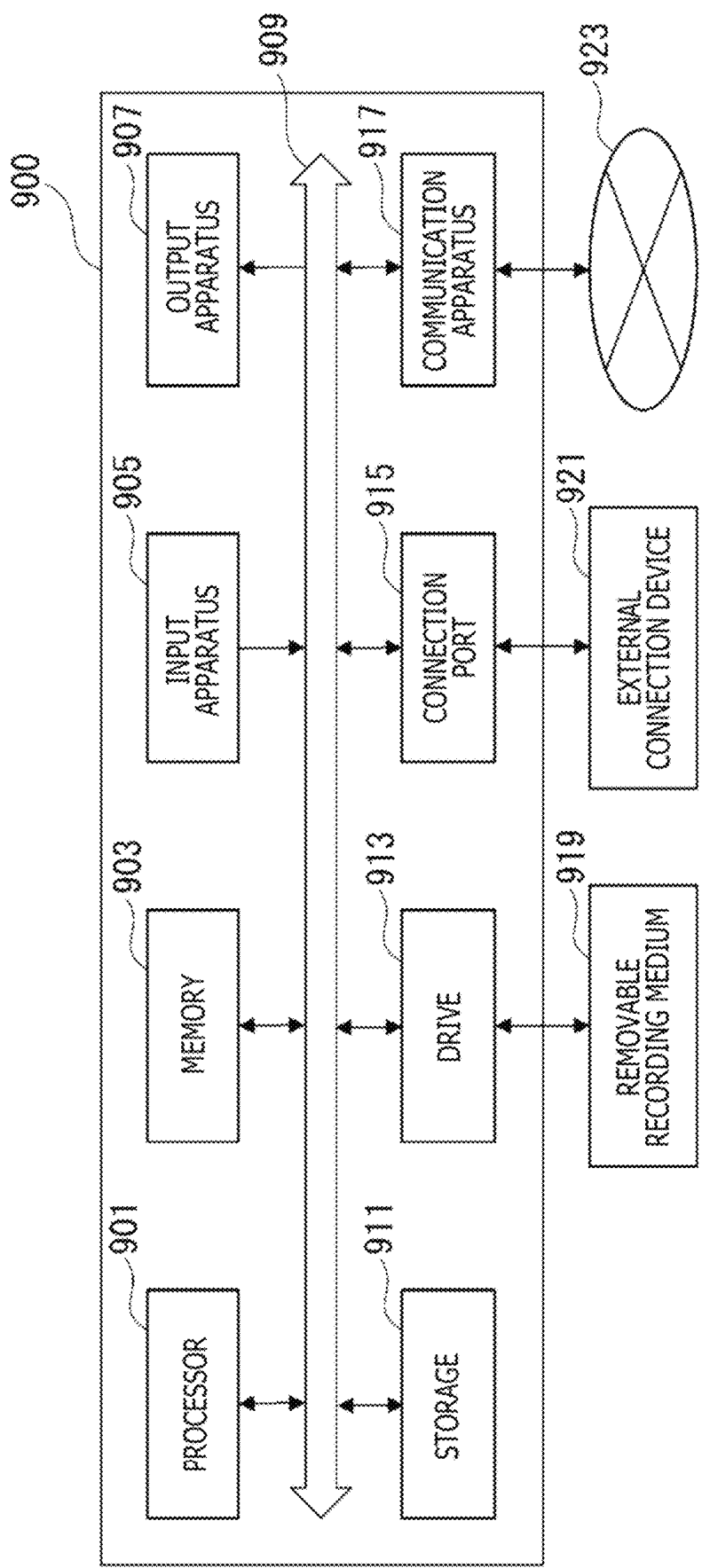
FIG. 16 is a block diagram illustrating an example of a hardware configuration of an information processing apparatus in the embodiments of the present invention.

Next, an example of a hardware configuration of an information processing apparatus according to the embodiments of the present invention will be described with reference to FIG. 16. FIG. 16 is a block diagram illustrating an example of the hardware configuration of the information processing apparatus according to the embodiments of the present invention.

The information processing apparatus 900 includes a processor 901, a memory 903, an input apparatus 905, an output apparatus 907, and a bus 909. The information processing apparatus 900 may further include a storage 911, a drive 913, a connection port 915, and a communication apparatus 917.

The processor 901 includes, for example, processing circuits, such as a central processing unit (CPU), a digital signal processor (DSP), an application specific integrated circuit (ASIC), and/or a field-programmable gate array (FPGA). The processor 901 functions as an operation processing apparatus and a control apparatus and controls the operation of the information processing apparatus 900 according to programs recorded in the memory 903, the storage 911, or a removable recording medium 919.

The memory 903 includes, for example, a read only memory (ROM) and a random access memory (RAM). The ROM stores, for example, programs for the processor 901, operation parameters, and the like. The RAM primarily stores, for example, a program deployed at the execution of the processor 901, parameters in executing the program, and the like.

The input apparatus 905 is, for example, an apparatus operated by the user, such as a mouse, a keyboard, a touch panel, a button, and various switches. The input apparatus 905 may not be integrated with the information processing apparatus 900 and may be, for example, a remote controller that transmits a control signal through wireless communication. The input apparatus 905 includes an input control circuit that generates an input signal based on information input by the user and outputs the input signal to the processor 901.

The output apparatus 907 includes an apparatus that can use senses, such as sight, hearing, and touch, to output information toward the user. The output apparatus 907 may include, for example, a display apparatus, such as a liquid crystal display (LCD) and an organic electro-luminescence (EL) display, a voice output apparatus, such as a speaker and a headphone, and a vibrator. The output apparatus 907 outputs the result obtained in the process of the information processing apparatus 900 in a form of image, such as text and picture, sound, such as voice and audio, or vibration.

The storage 911 includes, for example, a magnetic storage device such as a hard disk drive (HDD), a semiconductor storage device, an optical storage device, a magneto-optical storage device, or the like. The storage 911 stores, for example, programs for the processor 901, various types of data read at the execution of the programs or generated by the execution of the programs, various types of data acquired from the outside, and the like.

The drive 913 is a reader/writer for the removable recording medium 919, such as a magnetic disk, an optical disk, a magneto-optical disk, and a semiconductor memory. The drive 913 reads information recorded in the installed removable recording medium 919 and outputs the information to the memory 903. The drive 913 also writes various types of data to the installed removable recording medium 919.

The connection port 915 is a port for connecting an external connection device 921 to the information processing apparatus 900. The connection port 915 may include, for example, a USB port, an IEEE 1394 port, a small computer system interface (SCSI) port, and the like. The connection port 915 may also include an RS-232C port, an optical audio terminal, a high-definition multimedia interface (HDMI) (registered trademark) port, and the like. The external connection device 921 can be connected to the connection port 915 to exchange various types of data between the information processing apparatus 900 and the external connection device 921.

The communication apparatus 917 is connected to a network 923. Note that the network 923 may be, for example, an open communication network, such as the Internet, in which a large number of unspecified apparatuses are connected or may be, for example, a closed communication network, such as Bluetooth (registered trademark), in which limited apparatuses, such as two apparatus, are connected. The communication apparatus 917 may include, for example, a local area network (LAN), Bluetooth (registered trademark), Wi-Fi, or a communication card for wireless USB (WUSB). The communication apparatus 917 uses a predetermined protocol according to the network 923 to transmit and receive signals, data, and the like to and from other information processing apparatuses.

An example of the hardware configuration of the information processing apparatus 900 has been illustrated above. A general-purpose member may be used to provide each of the constituent elements, or hardware specific to the function of each constituent element may be used to provide the constituent element. In addition, those skilled in the art can appropriately change the configuration of the information processing apparatus 900 according to the technical level at the time of the implementation.

The embodiments of the present invention may include, for example, the system, the jig, and the information processing apparatus as described above, an information processing method executed by the information processing apparatus, a program for operating the information processing apparatus, and a non-transitory tangible medium recording the program.

Although some embodiments of the present invention have been described above in detail with reference to the attached drawings, the present invention is not limited to the examples. It is apparent that those with normal knowledge of the field of the invention can make various changes or modifications within the technical concept described in the claims, and it is understood that the changes and the modifications obviously belong to the technical scope of the present invention.

REFERENCE SIGNS LIST

10 . . . System, 100 . . . Terminal, 110 . . . Image acquisition unit, 120 . . . Angle information acquisition unit, 130 . . . Dictionary data generation unit, 150 . . . Camera, 160 . . . Platform device, 161 . . . Base, 162 . . . Support, 163 . . . Arm, 164 . . . Pin, 165 . . . Holder, 167 . . . Control unit, 170 . . . Jig, 171 . . . Attachment member, 172 . . . Connecting member, 173 . . . Object holder, 174 . . . Background plate, 200 . . . Database, 210 . . . Dictionary data, 300, 300a, 300b . . . Robot, 310 . . . Camera, 320 . . . Manipulator, 330 . . . Control unit, 331 . . . Image acquisition unit, 332 . . . Dictionary data acquisition unit, 333 . . . Object recognition/angle estimation unit, 334 . . . Result output unit, 335 . . . Dictionary data update unit, 336 . . . Manipulator control unit, 337 . . . Angle information acquisition/angle estimation unit, 339 . . . Motor control unit, 340 . . . sensor, 350 . . . Motor.

The invention claimed is:

1. A system comprising:
one or a plurality of information processing apparatuses that individually or cooperatively realize functions including:
a first image acquisition function of acquiring a first image of an object,
an angle information acquisition function of acquiring angle information indicating an angle of the object in the first image,
a dictionary data generation function of generating dictionary data based on the first image and the angle information,
a second image acquisition function of acquiring a second image of the object different from the first image, and
an angle estimation function of estimating an angle of the object in the second image based on the second image and the dictionary data; and
a holding means holding the object, where within the angle information acquisition function, the angle information indicating the angle of the object is acquired from the holding means, wherein the holding means includes a platform device, comprising:
a base portion that rotates about a first axis orthogonal to an optical axis of an imaging apparatus that captures the first image,
a pair of supports fixed at positions symmetric with respect to the first axis on the base portion,
a pair of arms connected to the pair of supports, respectively, so as to be pivotable about a second axis orthogonal to the first axis, on an opposite side of the base portion,
a holder fixed between edges of the pair of arms, on an opposite side of the pair of supports, and
a control unit that sets an angle of the base portion rotating about the first axis and an angle of the pair of arms pivoting about the second axis.

2. The system according to claim 1, wherein the dictionary data includes elements generated based on a plurality of images of the object different from each other and the angle information common to the plurality of images.

3. The system according to claim 1, wherein the holding means includes:
a jig including
an attachment member operable to be attached to the holder of the platform device,
an object holder for attaching the object, and
a connecting member that connects the attachment member and the object holder and defines a positional relationship between the attachment member and the object holder such that the object attached to the object holder is positioned proximate to an intersection of the first axis and the second axis when the attachment member is attached to the holder of the platform device, wherein
in the angle information acquisition function, the angle information is acquired from the control unit of the platform device.

4. A jig operable to be attached to a platform device, the platform device including a base portion that rotates about a first axis, a pair of supports fixed at positions symmetric with respect to the first axis on the base portion, a pair of arms connected to the pair of supports, respectively, so as to be pivotable about a second axis orthogonal to the first axis, on an opposite side of the base portion, a holder fixed between edges of the pair of arms, on an opposite side of the pair of supports, and a control unit that sets an angle of the base portion rotating about the first axis and an angle of the pair of arms pivoting about the second axis, the jig comprising:
an attachment member operable to be attached to the holder of the platform device;
an object holder for attaching the object; and
a connecting member that connects the attachment member and the object holder and defines a positional relationship between the attachment member and the object holder such that the object attached to the object holder is positioned proximate to an intersection of the first axis and the second axis when the attachment member is attached to the holder of the platform device.

5. The jig according to claim 4, wherein the connecting member has a structure that extends along the pair of arms of the platform device when the attachment member is attached to the holder of the platform device and capable of adjusting a length in a direction along the pair of arms.

6. The jig according to claim 4, further comprising: a background plate that provides an exchangeable background of the object attached to the object holder.

7. An information processing apparatus comprising:
a processor that realizes functions including:
an image acquisition function of acquiring a plurality of images of an object different from each other,
an angle information acquisition function of acquiring angle information common to the plurality of images, the angle information indicating an angle of the object, and
a dictionary data generation function of generating dictionary data based on the plurality of images and the angle information common to the plurality of images; and
a holding means holding the object, where within the angle information acquisition function, the angle information indicating the angle of the object is acquired from the holding means, wherein the holding means includes a platform device, comprising:
a base portion that rotates about a first axis orthogonal to an optical axis of an imaging apparatus that captures the first image, a pair of supports fixed at positions symmetric with respect to the first axis on the base portion, a pair of arms connected to the pair of supports, respectively, so as to be pivotable about a second axis orthogonal to the first axis, on an opposite side of the base portion, a holder fixed between edges of the pair of arms, on an opposite side of the pair of supports, and a control unit that sets an angle of the base portion rotating about the first axis and an angle of the pair of arms pivoting about the second axis.

8. The information processing apparatus according to claim 7, wherein the plurality of images include a plurality of images under different environmental conditions in capturing the plurality of images.

9. The information processing apparatus according to claim 8, wherein the environmental conditions include arrangement of a background or light.

10. An information processing apparatus comprising:
a processor that realizes functions including
a dictionary data acquisition function of acquiring a first image of an object and dictionary data generated based on angle information indicating an angle of the object in the first image, an image acquisition function of acquiring a second image of the object different from the first image, and an angle estimation function of estimating an angle of the object in the second image based on the second image and the dictionary data, wherein the angle estimation function includes at least one of:

a function of pruning the dictionary data based on the second image, a function of matching the second image with the pruned dictionary data, and a function of estimating the angle based on a result of the matching.

11. The information processing apparatus according to claim 10, wherein the function of pruning the dictionary data includes a function of extracting a plurality of feature parts from the second image, and a function of removing, from a target of the matching, elements in the dictionary data corresponding to the first image in which a positional relationship between the plurality of feature parts is not in common with the second image.

12. The information processing apparatus according to claim 10, wherein the processor further realizes a function of recognizing the object based on the result of the matching of the second image with the dictionary data.

13. An information processing method comprising:
acquiring dictionary data generated based on a first image of an object and angle information indicating an angle of the object in the first image;

acquiring a second image of the object different from the first image; and using a processor to estimate an angle of the object in the second image based on the second image and the dictionary data, wherein the estimating the angle includes at least one of:

pruning the dictionary data based on the second image, matching the second image with the pruned dictionary data, and estimating the angle based on a result of the matching.

14. The information processing method of claim 13, further comprising:

using a processor to generate dictionary data based on the first image, the second image, and angle information common to the first and second images.

15. A non-transitory, computer-readable storage medium containing a computer program, which when executed by a computer, causes the computer to carry out actions, comprising:

acquiring dictionary data generated based on a first image of an object and angle information indicating an angle of the object in the first image;

acquiring a second image of the object different from the first image; and estimating an angle of the object in the second image based on the second image and the dictionary data, wherein the estimating the angle includes at least one of:

pruning the dictionary data based on the second image, matching the second image with the pruned dictionary data, and estimating the angle based on a result of the matching.

16. The non-transitory, computer-readable storage medium of claim 15, further comprising:

generating dictionary data based on the first image, the second image, and angle information common to the first and second images.

* * * * *